(12) United States Patent
Yamaguchi et al.

(10) Patent No.: US 10,312,518 B2
(45) Date of Patent: Jun. 4, 2019

(54) ANODE AND METHOD OF MANUFACTURING THE SAME, AND SECONDARY BATTERY

(75) Inventors: Hiroyuki Yamaguchi, Fukushima (JP);
Hideki Nakai, Fukushima (JP);
Masayuki Ihara, Fukushima (JP);
Tadahiko Kubota, Kanagawa (JP);
Shigeru Fujita, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1122 days.

(21) Appl. No.: 12/255,279

(22) Filed: Oct. 21, 2008

(65) Prior Publication Data
US 2009/0111020 A1 Apr. 30, 2009

(30) Foreign Application Priority Data
Oct. 26, 2007 (JP) .................. 2007-278728

(51) Int. Cl.
| H01M 4/62 | (2006.01) |
| H01M 4/134 | (2010.01) |
| H01M 4/139 | (2010.01) |
| H01M 10/052 | (2010.01) |
| H01M 10/0567 | (2010.01) |
| H01M 10/0568 | (2010.01) |
| H01M 10/0569 | (2010.01) |

(52) U.S. Cl.
CPC .............. *H01M 4/62* (2013.01); *H01M 4/134* (2013.01); *H01M 4/139* (2013.01); *H01M 10/052* (2013.01); *H01M 10/0567* (2013.01); *H01M 10/0568* (2013.01); *H01M 10/0569* (2013.01)

(58) Field of Classification Search
CPC ........ H01M 4/62; H01M 4/134; H01M 4/139; H01M 10/052
See application file for complete search history.

(56) References Cited

U.S. PATENT DOCUMENTS

| 4,950,566 A | 8/1990 | Huggins | |
| 2002/0086213 A1* | 7/2002 | Utsugi et al. | ............ 429/231.95 |
| 2004/0043294 A1* | 3/2004 | Fukui | ................. B22F 7/08 |
| | | | 429/235 |

(Continued)

FOREIGN PATENT DOCUMENTS

| JP | 62-190666 | 8/1987 |
| JP | 06-325765 | 11/1994 |

(Continued)

OTHER PUBLICATIONS

Japanese Office Action dated Jul. 31, 2012, in connection with counterpart JP Application No. 2007-278728.

*Primary Examiner* — Melvin C. Mayes
*Assistant Examiner* — Michael Forrest
(74) *Attorney, Agent, or Firm* — Dentons US LLP

(57) ABSTRACT

An anode and a secondary battery capable of improving the charge and discharge efficiency are provided. The anode includes an anode current collector, and an anode active material layer provided on the anode current collector. The anode active material layer has a plurality of anode active material particles containing at least one of a simple substance of silicon, a compound of silicon, a simple substance of tin and a compound of tin, and has a coat containing an oxo acid salt in at least part of the surface of the anode active material particles.

16 Claims, 11 Drawing Sheets

(56) References Cited

U.S. PATENT DOCUMENTS

| | | | |
|---|---|---|---|
| 2004/0072066 A1* | 4/2004 | Cho et al. | 429/137 |
| 2005/0042515 A1* | 2/2005 | Hwang | H01M 4/13 429/231.95 |
| 2005/0042519 A1* | 2/2005 | Roh | H01M 10/0525 429/330 |
| 2006/0134528 A1* | 6/2006 | Ihara et al. | 429/329 |
| 2007/0122701 A1* | 5/2007 | Yamaguchi | H01M 4/131 429/218.1 |

FOREIGN PATENT DOCUMENTS

| | | |
|---|---|---|
| JP | 10-255800 | 9/1998 |
| JP | 2001-068094 | 3/2001 |
| JP | 2002-319432 | 10/2002 |
| JP | 2002-352860 | 12/2002 |
| JP | 2004-152619 | 5/2004 |
| JP | 2004-158453 | 6/2004 |
| JP | 2004-165097 | 6/2004 |
| JP | 2004-171875 | 6/2004 |
| JP | 2004-296412 | 10/2004 |
| JP | 2004 319469 | * 11/2004 |
| JP | 2004-319469 | * 11/2004 |
| JP | 2005-011801 | 1/2005 |
| JP | 2005-026203 | 1/2005 |
| JP | 2005-26230 | 1/2005 |
| JP | 2005-063731 | 3/2005 |
| JP | 2005-142156 | 6/2005 |
| JP | 2005-166469 | 6/2005 |
| JP | 2005166469 A | * 6/2005 |
| JP | 2005-235591 | 9/2005 |
| JP | 2005-293899 | 10/2005 |
| JP | 2005-340132 | 12/2005 |
| JP | 2006-012806 | 1/2006 |
| JP | 2006-185728 | 7/2006 |
| JP | 2006-190635 | 7/2006 |
| JP | 2006-260889 | 9/2006 |
| JP | 2007-005267 | 1/2007 |
| WO | 2004/109839 | 12/2004 |

* cited by examiner

ANODE AND METHOD OF MANUFACTURING THE SAME, AND SECONDARY BATTERY

CROSS REFERENCES TO RELATED APPLICATIONS

The present invention contains subject matter related to Japanese Patent Application JP 2007-278728 filed in the Japanese Patent Office on Oct. 26, 2007, the entire contents of which being incorporated herein by reference.

BACKGROUND OF THE INVENTION

1. Field of the Invention

The present invention relates to an anode that contains an anode active material containing at least one of a simple substance of silicon, a compound of silicon, a simple substance of tin and a compound of tin, a method of manufacturing the same, and a secondary battery.

2. Description of the Related Art

In recent years, many portable electronic devices such as a combination camera (video tape recorder), a digital still camera, a mobile phone, a personal digital assistance, and a notebook personal computer have been introduced, and down sizing and weight saving thereof have been made. Accordingly, as a power source thereof, a light-weight secondary battery capable of providing a high energy density has been developed. Specially, the lithium ion secondary battery in which a carbon material is used for the anode, a complex material of lithium (Li) and a transition metal is used for the cathode, and ester carbonate is used for an electrolytic solution provides a higher energy density compared to traditional lead batteries and nickel cadmium batteries, and therefore the lithium ion secondary battery is in practical use widely.

Further, in recent years, as performance of portable electronic devices has been improved, further improvement of the capacity has been demanded. It has been considered that as an anode active material, tin, silicon or the like is used instead of the carbon material (for example, refer to U.S. Pat. No. 4,950,566). The theoretical capacity of tin is 994 mAh/g and the theoretical capacity of silicon is 4199 mAh/g, which are significantly large compared to the theoretical capacity of graphite, 372 mAh/g, and therefore capacity improvement is expected therewith.

However, a tin alloy or a silicon alloy inserting lithium has a high activity. Therefore, there have been disadvantages that an electrolytic solution is easily decomposed, and lithium is inactivated. Accordingly, when charge and discharge are repeated, charge and discharge efficiency is lowered, and sufficient cycle characteristics are not able to be obtained.

Meanwhile, it has been considered to form an inert layer on the surface of an anode active material. For example, it has been proposed that a lithium salt coat is formed on the surface of the anode active material (for example, refer to Japanese Unexamined Patent Application Publication Nos. 2005-166469, 10-255800, 2005-26230, 2005-142156, 2004-165097, and 2004-171875). Further, the type of anode active material has been considered. For example, it has been proposed that a lithium-containing oxide is contained in the anode active material, or a silicate is used as an anode active material (for example, refer to Japanese Unexamined Patent Application Publication Nos. 2005-011801 and 06-325765). Further, it has been considered to form a layer having ion conductivity and electron conductivity on the surface of the cathode active material. For example, it has been proposed that an inorganic oxide coat is formed on the surface of a cathode active material (for example, refer to Japanese Unexamined Patent Application Publication No. 2007-005267). Further, it has been considered to add an additive to an electrolytic solution. For example, it has been proposed that lithium orthosilicate as a carbon dioxide absorbent is contained in an electrolytic solution, or lithium silicate as an alkali compound is contained in an electrolytic solution (for example, refer to Japanese Unexamined Patent Application Publication Nos. 2006-260889 and 2002-352860). Furthermore, it has been considered to form an inorganic protective film on the surface of the separator. For example, it has been proposed that a lithium salt coat is formed on the surface of a separator (for example, refer to Japanese Unexamined Patent Application Publication No. 2004-158453). In addition, it has been considered to introduce a gas absorbent into a battery. For example, it has been proposed that lithium silicate is included in a battery (for example, refer to Japanese Unexamined Patent Application Publication No. 2004-152619).

SUMMARY OF THE INVENTION

However, in the case where a silicon material or a tin material is used as an anode active material, the following issue still remains. That is, as cycles are repeated, a hyperactive active material face emerges and an electrolytic solution is decomposed. Thus, further improvement has been aspired.

In view of the foregoing, in the invention, it is desirable to provide an anode and a secondary battery that improve the charge and discharge efficiency and have superior cycle characteristics.

According to an embodiment of the invention, there is provided an anode including an anode current collector and an anode active material layer provided on the anode current collector, in which the anode active material layer has a plurality of anode active material particles containing at least one of a simple substance of silicon, a compound of silicon, a simple substance of tin and a compound of tin, and has a coat containing an oxo acid salt in at least part of the surface of the anode active material particles.

According to the anode of the embodiment of the invention, the coat containing the oxo acid salt is formed on the surface of the anode active material particles containing at least one of a simple substance of silicon, a compound of silicon, a simple substance of tin and a compound of tin, and thereby decomposition of the electrolytic solution is prevented while improving the battery capacity. Therefore, according to a secondary battery using the anode, the discharge capacity retention ratio is improved and superior cycle characteristics are obtained.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment: First Secondary Battery

Figure 1:
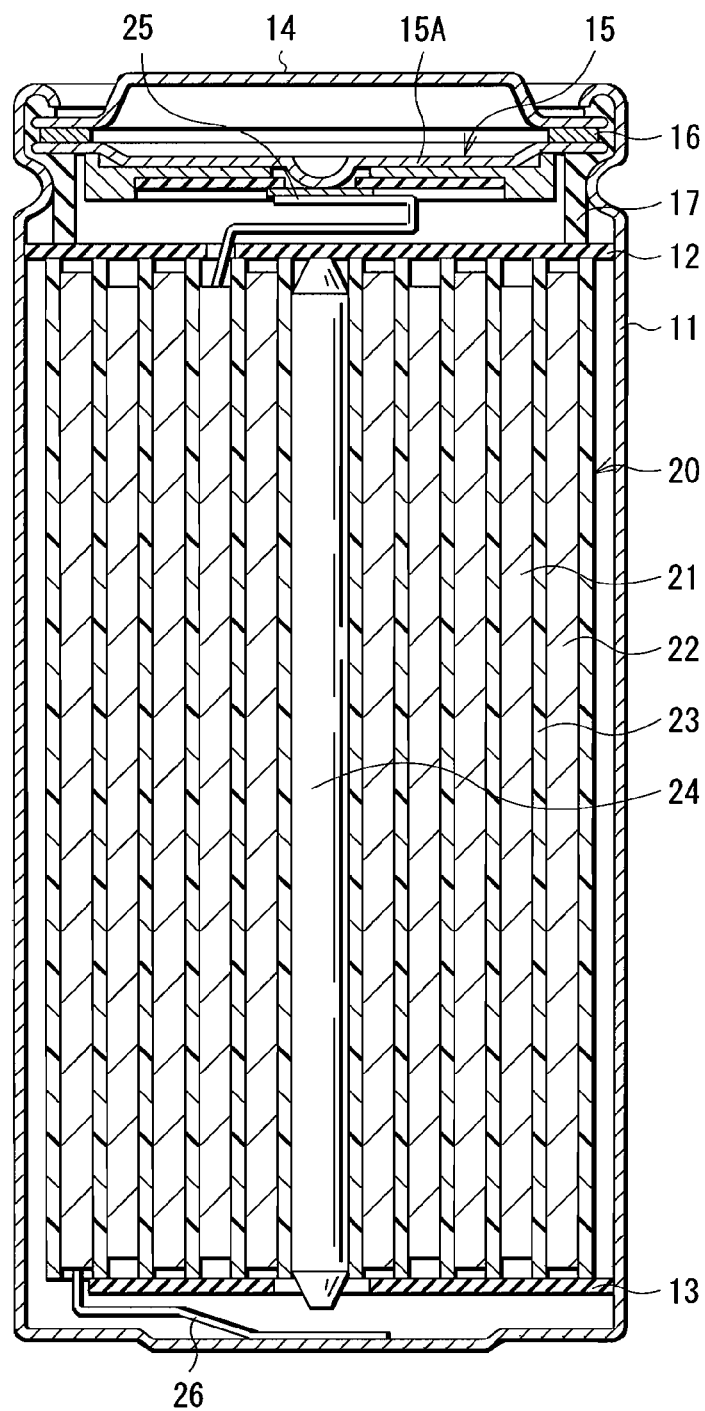
FIG. 1 is a cross section view showing a structure of a secondary battery according to a first embodiment of the invention.

FIG. 1 shows a cross sectional structure of a first secondary battery according to a first embodiment of the invention. The secondary battery is a so-called cylindrical battery, and has a spirally wound electrode body 20 in which a strip-shaped cathode 21 and a strip-shaped anode 22 are layered with a separator 23 in between and spirally wound inside a battery can 11 in the shape of an approximately hollow cylinder. The battery can 11 is made of, for example, iron plated by nickel. One end of the battery can 11 is closed, and the other end thereof is opened. An electrolytic solution is injected into the battery can 11, and impregnated in the separator 23. A pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 with the PTC device 16 in between. When the internal pressure of the battery becomes a certain level or more by internal short circuit, external heating or the like, a disk plate 15A flips to cut the electrical connection between the battery cover 14 and the spirally wound electrode body 20. If temperature rises, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Cathode

Figure 2:
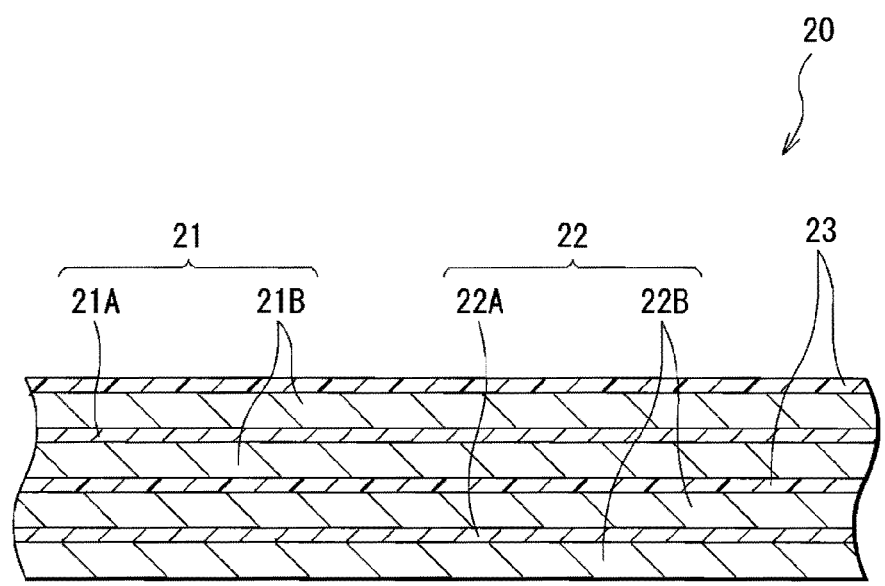
FIG. 2 is a cross section view showing an enlarged part of the spirally wound electrode body in the secondary battery shown in FIG. 1.

FIG. 2 shows an enlarged part of the spirally wound electrode body 20 shown in FIG. 1. The cathode 21 has, for example, a cathode current collector 21A having a pair of opposed faces and a cathode active material layer 21B provided on the both faces or a single face of the cathode current collector 21A. The cathode current collector 21A is, for example, made of a metal foil such as an aluminum foil, a nickel foil, and a stainless foil.

The cathode active material layer 21B contains, for example, as a cathode active material, a cathode material capable of inserting and extracting lithium as an electrode reactant. As the cathode material, for example, lithium-containing compounds are preferable, since some thereof are able to provide a high voltage and a high energy density. As the lithium-containing compound, for example, a complex oxide containing lithium and a transition metal element or a phosphate compound containing lithium and a transition metal element is cited. In particular, a compound containing at least one of cobalt, nickel, manganese, and iron as a transition metal element is preferable, since thereby a higher voltage is obtained. The chemical formula thereof is expressed as, for example, $Li_xM1O_2$ or $Li_yM2PO_4$. In the formula, M1 and M2 represent one or more transition metal elements. Values of x and y vary according to the charge and discharge state of the battery, and are generally in the range of $0.05 \leq x \leq 1.10$ and $0.05 \leq y \leq 1.10$.

As a specific example of the lithium complex oxide containing lithium and a transition metal element, a lithium cobalt complex oxide ($Li_xCoO_2$), a lithium nickel complex oxide ($Li_xNiO_2$), a lithium nickel cobalt complex oxide ($Li_xNi_{(1-z)}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) or the like is cited. Specially, a complex oxide containing nickel is preferable, since thereby a high capacity is obtained and superior cycle characteristics are obtained.

As a specific example of the phosphate compound containing lithium and a transition metal element, for example, lithium iron phosphate compound ($LiFePO_4$) or a lithium iron manganese phosphate compound ($LiFe_{(1-u)}Mn_uPO_4$ (u<1)) or the like is cited.

In addition, some of compounds not containing lithium may be used as a cathode material. For example, an oxide such as titanium oxide, vanadium oxide, and manganese dioxide; a disulfide such as iron disulfide, titanium disulfide and molybdenum sulfide; a chalcogenide such as niobium selenide; a conductive polymer such as polyaniline and polythiophene are cited.

One of the foregoing cathode materials may be used singly, or two or more thereof may be used by mixture.

Further, the cathode active material layer 21B may contains an electrical conductor, and may further contain a binder if necessary. As an electrical conductor, for example, a carbon material such as graphite, carbon black, and Ketjen black are cited. One thereof is used singly, or two or more thereof are used by mixture. In addition to the carbon material, a metal material, a conductive polymer material or the like may be used, as long as the material has conductivity. As a binder, for example, a synthetic rubber such as styrene butadiene rubber, fluorinated rubber, and ethylene propylene diene rubber, or a polymer material such as polyvinylidene fluoride is cited. One thereof is used singly, or two or more thereof are used by mixture. For example, when the cathode 21 and the anode 22 are spirally wound as shown in FIG. 1, styrene butadiene rubber, fluorinated rubber or the like having flexibility as a binder is preferably used.

Anode

The anode 22 has, for example, an anode current collector 22A having a pair of opposed faces and an anode active material layer 22B provided on the both faces or a single face of the anode current collector 22A. The anode current collector 22A is, for example, made of a metal foil made of a metal material such as copper, nickel, and stainless having favorable electrochemical stability, favorable electric conductivity, and favorable mechanical strength. In particular, a copper foil is most preferable since high electric conductivity is thereby obtained.

The anode active material layer 22B contains at least one of a simple substance of silicon, a compound of silicon, a simple substance of tin and a compound of tin as an anode active material. Silicon and tin have a high ability to insert and extract lithium, and thus provide a high energy density The anode active material is composed of a plurality of particles. That is, the anode active material layer 22B has a plurality of anode active material particles.

As such an anode active material, for example, the simple substance, an alloy, or a compound of silicon; the simple substance, an alloy, or a compound of tin; or a material having one or more phases thereof at least in part is cited.

In the invention, "the alloy" includes an alloy containing one or more metal elements and one or more metalloid elements, in addition to an alloy composed of two or more metal elements. Further, "the alloy" may contain a nonmetallic element. The texture thereof includes a solid solution, a eutectic crystal (eutectic mixture), an intermetallic compound, and a texture in which two or more thereof coexist.

As the alloy of silicon, an alloy containing silicon and at least one selected from the group consisting of tin, nickel, copper, iron, cobalt, manganese, zinc, indium, silver, titanium, germanium, bismuth, antimony, and chromium as the second element is cited. As the alloy of tin, an alloy containing tin and at least one selected from the group consisting of silicon, nickel, copper, iron, cobalt, manganese, zinc, indium, silver, titanium, germanium, bismuth, antimony, and chromium as the second element is cited. As the compound of silicon or as the compound of tin, for example, a compound containing oxygen or carbon is cited, and may contain the foregoing second element in addition to tin or silicon.

Specific examples of the alloy or the compound containing silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), LiSiO and the like.

Further, as an anode active material, only the silicon simple substance may be used, or a material having the silicon simple substance as a main body may be used. As the material having the silicon simple substance as a main body, a material that contains 50 wt % or more of silicon and oxygen or preferably contains 50 wt % or more of the silicon simple substance, and that contains less than 50 wt % of one or more elements other than silicon and oxygen is cited. As other element, for example, titanium (Ti), chromium (Cr), manganese (Mn), iron (Fe), cobalt (Co), nickel (Ni), copper (Cu), zinc (Zn), indium (In), silver (Ag), magnesium (Mg), aluminum (Al), germanium (Ge), tin (Sn), bismuth (Bi) or antimony (Sb) is cited. Such a material is able to be obtained, for example, by providing such other element between silicon simple substance layers, or by co-evaporating silicon and other elements.

As a specific example of the alloy or the compound containing tin, $SnSiO_3$, LiSnO, $Mg_2Sn$, an alloy containing tin and cobalt and the like are cited. Specially, a SnCoC-containing material that contains tin, cobalt, and carbon as an element in which the carbon content is in the range from 9.9 wt % to 29.7 wt %, and the cobalt ratio to the total of tin and cobalt (Co/(Sn+Co)) is in the range from 30 wt % to 70 wt % is preferably contained. In such a composition range, a high energy density is obtained, and superior cycle characteristics are obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby the capacity or the cycle characteristics are able to be further improved.

The SnCoC-containing material has a phase containing tin, cobalt, and carbon. Such a phase preferably has a low crystalline structure or an amorphous structure. Further, in the SnCoC-containing material, at least part of carbon as an element is preferably bonded to a metal element or a metalloid element as other element. The cycle characteristics may be lowered due to cohesion or crystallization of tin or the like. Thus, when carbon is bonded to other element, such cohesion or crystallization is thereby prevented.

As a measurement method for examining bonding state of elements, for example, X-ray Photoelectron Spectroscopy (XPS) is used. In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the SnCoC-containing material is observed in the region lower than 284.5 eV, at least part of carbon contained in the SnCoC-containing material is bonded to the metal element or the metalloid element as other element.

In XPS measurement, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the SnCoC-containing material. Therefore, for example, by analyzing the waveform with the use of commercially available software, the peak of the surface contamination carbon and the peak of carbon in the SnCoC-containing material are separated. In the analysis of the waveform, the position of the main peak existing on the lowest bound energy side is set to the energy reference (284.8 eV).

Such an anode active material may be manufactured by, for example, mixing raw materials of respective elements, dissolving the resultant mixture in an electric furnace, a high frequency induction furnace, an arc melting furnace or the like and then solidifying the resultant. Otherwise, such an anode active material may be manufactured by various atomization methods such as gas atomizing and water atomizing; various roll methods; or a method using mechanochemical reaction such as mechanical alloying method and mechanical milling method. Specially, it is preferable to manufacture the anode active material by the method using mechanochemical reaction, since thereby the anode active material has a low crystalline structure or an amorphous structure. For the method using the mechanochemical reaction, for example, a manufacturing apparatus such as a planetary ball mill apparatus and an attliter may be used.

As a method of forming the anode active material layer 22B on the anode current collector 22A, for example, vapor-phase deposition method, liquid-phase deposition method, firing method, or a combination of two or more of these methods may be used. The anode active material layer 22B and the anode current collector 22A are preferably alloyed in at least part of the interface thereof. Specifically, at the interface thereof, the element of the anode current collector 22A is preferably diffused in the anode active material layer 22B; or the element of the anode active material layer 22B is preferably diffused in the anode current collector 22A; or these elements are preferably diffused in each other. Thereby, destruction due to expansion and shrinkage of the anode active material layer 22B associated with charge and discharge is prevented, and the electron conductivity between the anode active material layer 22B and the anode current collector 22A is improved.

As vapor-phase deposition method, for example, physical deposition method or chemical deposition method is cited. Specifically, vacuum evaporation method, sputtering method, ion plating method, laser ablation method, thermal Chemical Vapor Deposition (CVD) method, plasma CVD method, spraying method or the like is cited. As liquid-phase deposition method, a known technique such as electrolytic plating and electroless plating may be used. Firing method is, for example, a method in which a particulate anode active material is mixed with a binder or the like, the resultant mixture is dispersed in a solvent, coating is provided, and then heat treatment is provided at a temperature higher than the melting point of the binder or the like. For firing method, a known technique such as atmosphere firing method, reactive firing method, and hot press firing method is available as well.

In addition to the foregoing anode active material, the anode active material layer 22B may further contain other anode active material or other material such as an electrical conductor. As other anode active material, for example, a carbonaceous material capable of inserting and extracting lithium is cited. The carbonaceous material is preferable, since the carbonaceous material improves the charge and discharge cycle characteristics and functions as an electrical conductor. As the carbonaceous material, for example, one or more of graphitizable carbon, non-graphitizable carbon, graphite, pyrolytic carbon, coke, glassy carbon, an organic polymer compound fired body, activated carbon, carbon black and the like are used. Of the foregoing, the coke includes pitch coke, needle coke, petroleum coke and the like. The organic polymer compound fired body is obtained by firing and carbonizing a polymer compound such as a phenol resin and a furan resin at an appropriate temperature. The shape of the carbonaceous material may be any of a fibrous shape, a spherical shape, a granular shape, and a scale-like shape.

In the case where the anode active material layer 22B is formed by deposition method such as vapor-phase deposition method, the anode active material layer 22B may be formed by a single deposition step or may be formed by a plurality of deposition steps. More specifically, when the anode active material layer 22B contains a plurality of anode active material particles, the anode active material particles may have a single layer structure or may have a multilayer structure in the particle. As a representative of vapor-phase deposition method, evaporation method is taken as an example. In the case where the anode active material particles are formed to have a multilayer structure, it is possible that the anode active material is deposited over several times while the anode current collector 22A is relatively reciprocated to an evaporation source. Otherwise, it is possible that the anode active material is deposited over several times while repeating opening and closing a shutter as the anode current collector 22A is kept fixed to the evaporation source. However, in the case where the anode active material layer 22B is formed by evaporation method or the like accompanying high heat in deposition, to prevent thermal damage of the anode current collector 22A, the anode active material particles preferably have a multilayer structure. When the deposition step is divided into several steps, time that the anode current collector 22A is exposed at high heat is reduced compared to a case that the deposition is performed in a single deposition step.

The anode and the secondary battery of the embodiment of the invention have a coat containing an oxo acid salt in at least part of the surface of the foregoing anode active material particles. More specifically, the anode active material particles have the coat containing the oxo acid salt in at least a region where the anode active material particles are contacted with an electrolytic solution. Thereby, decomposition of the electrolytic solution is able to be prevented. This is because electrochemical reaction is initiated between the oxo acid salt on the surface of the anode active material particles and an electrolyte salt in the electrolytic solution in the initial charge, and thereby a protective film is formed. The protective film is a stable film that efficiently transmits lithium ions and prevents decomposition of the electrolytic solution. The protective film may protect the electrode. As a result, the cycle characteristics of the battery are improved.

The coat containing the oxo acid salt may be formed on the entire surface of the anode active material particles.

As the oxo acid salt, a poly acid salt or the like is cited. More specifically, as the oxo acid salt, for example, a borate, a phosphate, a silicate, an aluminate or the like is cited.

As an example of the borate, calcium borate, cobalt borate, zinc borate (zinc tetraborate, zinc metaborate and the like), aluminum potassium borate, ammonium borate (ammonium metaborate, ammonium tetraborate, ammonium pentaborate, ammonium octaborate and the like), cadmium borate (cadmium orthoborate, cadmium tetraborate and the like), sodium borate (sodium metaborate, sodium tetraborate, sodium pentaborate, sodium hexaborate, sodium octaborate and the like), silver borate (silver metaborate, silver tetraborate and the like), copper borate (cupric borate, copper metaborate, copper tetraborate and the like), sodium borate (sodium metaborate, sodium diborate, sodium tetraborate, sodium pentaborate, sodium hexaborate, sodium octaborate and the like), lead borate (lead metaborate, lead hexaborate and the like), nickel borate (nickel orthoborate, nickel diborate, nickel tetraborate, nickel octoborate and the like), barium borate (barium orthoborate, barium metaborate, barium diborate, barium tetraborate and the like), bismuth borate, magnesium borate (magnesium orthoborate, magnesium diborate, magnesium metaborate, trimagnesium tetraborate, pentamagnesium tetraborate and the like), manganese borate (primary manganese borate, manganese metaborate, manganese tetraborate and the like), lithium borate (lithium metaborate, lithium tetraborate, lithium pentaborate and the like), a borate mineral such as borax, kernite, injoite, kotoite, suanite, and szaibelyte or the like is cited. Lithium tetraborate or lithium metaborate are preferably cited.

As the lithium salt, for example, lithium pyrophosphate, sodium pyrophosphate, lithium tripolyphosphate, sodium tripolyphosphate, lithium polyphosphate and sodium polyphosphate are cited.

As the silicate, for example, lithium silicate (lithium orthosilicate, lithium metasilicate, lithium metadisilicate, lithium trisilicate and the like), sodium silicate (sodium orthosilicate, sodium metasilicate and the like), potassium silicate (potassium orthosilicate, potassium metasilicate and the like), calcium silicate (calcium metasilicate and the like), magnesium silicate (magnesium trisilicate and the like), aluminum silicate, zinc silicate, zirconium silicate and the like are cited.

As the aluminate, for example, lithium aluminate and sodium aluminate are cited.

As a method of forming the coat containing the oxo acid salt on the surface of the anode active material particles, a method in which after the anode active material layer 22B is provided on the foregoing anode current collector 22A, an aqueous solution or a polar solvent solution of the foregoing oxo acid salt is treated by liquid-phase deposition method such as coating method, soaking method, and dip coating method; or vapor-phase deposition method such as evaporation method, sputtering method, and Chemical Vapor Deposition (CVD) method is cited. Otherwise, the coat may be formed by adding the borate into the after-mentioned electrolytic solution. Specially, as a method of forming the coat containing the oxo acid salt, liquid-phase deposition method is preferable, since thereby the coat containing the oxo acid salt easily covers a wide range of the surface of the anode active material particles.

When dipping method is used, for example, the anode current collector 22A on which the anode active material layer 22B is formed is dipped into a 1 wt % to 5 wt % lithium borate aqueous solution for several seconds, the resultant is taken out and dried at room temperature. Thereby, a coat of lithium borate is formed on the surface of the anode active material particles.

Further, the coat containing the oxo acid salt preferably further contains an alkali metal salt or an alkali earth metal salt, since thereby the coat resistance is lowered. Specifically, a carbonate of an alkali metal or an alkali earth metal (lithium carbonate), a halide salt (lithium fluoride), a borate (lithium tetraborate, lithium metaborate), a phosphate (lithium pyrophosphate, lithium tripolyphosphate) and the like are cited. These may be concurrently added into the oxo acid salt solution used for forming the coat containing the oxo acid salt.

Moreover, it is preferable that a coat containing an oxide of at least one selected from the group consisting of silicon, germanium, and tin is further provided between the anode active material particles and the coat containing the oxo acid salt. Thereby, decomposition of the electrolytic solution is prevented. The coat containing the oxide may be formed by, for example, liquid-phase deposition method such as liquid-phase precipitation method, sol gel method, polysilazane method, electrocrystallization method, and dip coating method; or vapor-phase deposition method such as evaporation method, sputtering method, and Chemical Vapor Deposition (CVD) method.

A description will be given in detail of the anode 22 with reference to FIG. 3 to FIGS. 6A and 6B.

Figure 3:
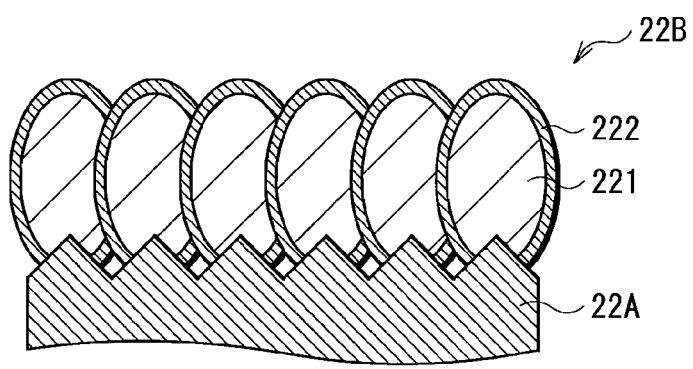
FIG. 3 is a cross section view schematically showing the anode shown in FIG. 2.
Figure 4:
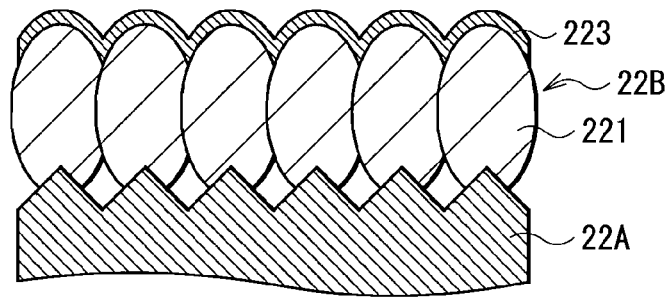
FIG. 4 is a cross section schematically showing an anode of a reference example to the anode shown in FIG. 2.

FIG. 3 schematically shows a cross sectional structure of the anode 22. FIG. 4 schematically shows a cross sectional structure of an anode as a reference example to the anode 22. In the anode 22 of the embodiment of the invention, as shown in FIG. 3, for example, when the anode active material is deposited on the anode current collector 22A by vapor-phase deposition method such as evaporation method, a plurality of anode active material particles 221 are formed on the anode current collector 22A and thereby the anode active material layer 22B is formed. In this case, when the surface of the anode current collector 22A is roughened and a plurality of projections (for example, fine particles formed by electrolytic treatment) exist on the surface thereof, the anode active material particles 221 are grown for every projection in the thickness direction. Thus, the plurality of anode active material particles 221 are arranged on the anode current collector 22A, and are linked to the anode current collector 22A at the root. After that, for example, when a coat 222 containing the oxo acid salt is formed on the surface of the anode active material particle 221 by liquid-phase deposition method such as dipping method, the coat 222 covers almost entire surface of the anode active material particle 221, in particular, covers a wide range from the top to the root of the anode active material particle 221. Such a large range covered with the coat 222 is a characteristic obtained when the coat 222 is formed by liquid-phase deposition method. That is, when the coat 222 is formed by liquid-phase deposition method, such formation action is applied not only to the top of the anode active material particle 221 but also to the root thereof. Accordingly, the anode active material particle 221 is covered with the coat 222 down to the root thereof.

Meanwhile, in the anode of the reference example, as shown in FIG. 4, for example, when the plurality of anode active material particles 221 are formed by vapor-phase deposition method and then a coat 223 containing the oxo acid salt is formed by vapor-phase deposition method similarly, the coat 223 covers only the top of the anode active material particle 221. Such a small range covered with the coat 223 is a characteristic obtained when the coat 223 is formed by vapor-phase deposition method. That is, when the coat 223 is formed by vapor-phase deposition method, such formation action is applied to the top of the anode active material particle 221 but not applied to the root thereof. Accordingly, the anode active material particle 221 is not covered with the coat 223 down to the root thereof.

In FIG. 3, the description has been given of a case where the anode active material layer 22B is formed by vapor-phase deposition method. However, in the case where the anode active material layer 22B is formed by sintering method or the like, the coat containing the oxo acid salt is formed to cover almost entire surface of the plurality of anode active material particles as well.

Figure 5A:
FIGS. 5A and 5B are an SEM photograph showing a cross sectional structure of the anode shown in FIG. 2 and a schematic view thereof.
Figure 5B:
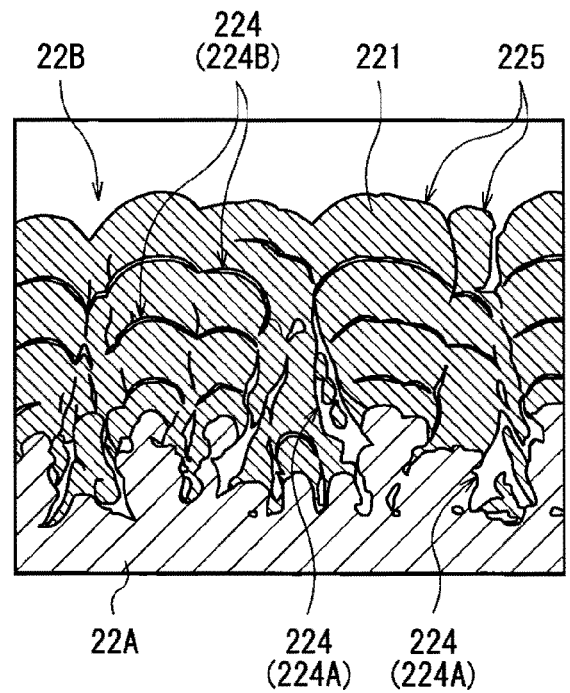

FIGS. 5A and 5B show an enlarged cross sectional structure of the anode 22. FIG. 5A is a Scanning Electron Microscope (SEM) photograph (secondary electron image), and FIG. 5B is a schematic drawing of the SEM image shown in FIG. 5A. FIGS. 5A and 5B show a state that the plurality of anode active material particles 221 formed by vapor-phase deposition method have the multilayer structure, and the coat containing the oxo acid salt is not formed yet on the surface of the anode active material particles 221.

In the case where the anode active material particles 221 have the multilayer structure in the particle, a plurality of gaps 224 are generated in the anode active material layer 22B due to the dense structure and the multilayer structure of the plurality of anode active material particles 221.

The gap 224 mainly includes two types of gaps 224A and 224B categorized according to the cause of generation. The gap 224A is a gap generated between the anode active material particles 221. Meanwhile, the gap 224B is a gap generated between each layer in the anode active material particles 221.

On the exposed face (outermost surface) of the anode active material particle 221, a void 225 may be generated. As a fibrous minute projection (not shown) is generated on the surface of the anode active material particles 221, the void 225 is generated between the projections. The void 225 may be generated entirely over the exposed face of the anode active material particles 221, or may be generated in part thereof. Since the foregoing fibrous minute projection is generated on the surface of the anode active material particles 221 every time when the anode active material particles 221 are formed, the void 225 may be generated between each layer in addition to on the exposed face of the anode active material particles 221.

Figure 6A:
FIGS. 6A and 6B are an SEM photograph showing another cross sectional structure of the anode shown in FIG. 2 and a schematic view thereof.
Figure 6B:
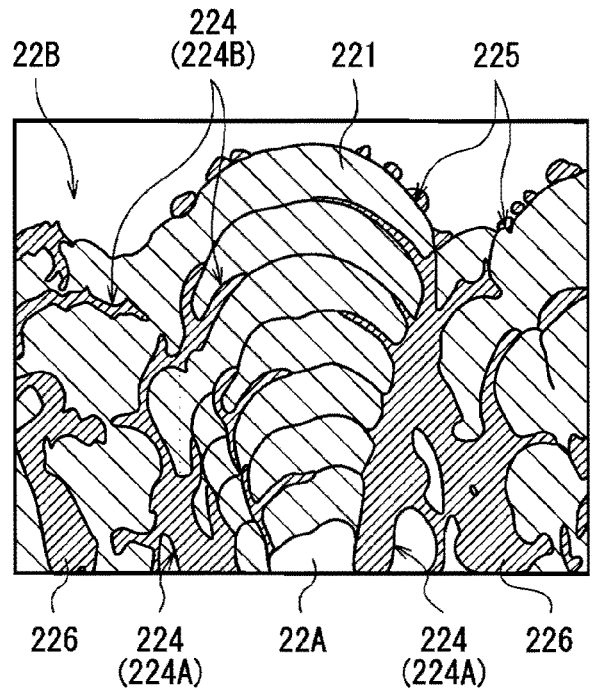

FIGS. 6A and 6B show another cross sectional structure of the anode 22, and correspond to FIGS. 5A and 5B. The anode active material layer 22B preferably has a metal material 226 not being alloyed with the electrode reactant in the gaps 224A and 224B. The plurality of anode active material particles 221 are bound by the metal material 226, and expansion and shrinkage of the anode active material layer 22B are suppressed, and thus the cycle characteristics are improved. In this case, only one of the gaps 224A and 224B may have the metal material 226, but the both gaps 224A and 224B preferably have the metal material 226, since thereby higher effects are obtained. The metal material 226 contains a metal element not being alloyed with the electrode reactant. As the metal element, for example, at least one selected from the group consisting of iron, cobalt, nickel, zinc, and copper is cited. It is needless to say that a metal element other than the foregoing elements may be contained. "Metal material" herein is a comprehensive term, and may be any of a simple substance, an alloy, and a compound, as long as the metal material contains a metal element not being alloyed with an electrode reactant.

The metal material 226 intrudes into the gap 224A between adjacent anode active material particles 221. More specifically, in the case where the anode active material particles 231 are formed by vapor-phase deposition method or the like, the anode active material particles 221 are grown for every projection existing on the surface of the anode current collector 22A as described above, and thus the gap 224A is generated between the adjacent anode active material particles 221. The gap 224A causes lowering of the binding characteristics of the anode active material layer 22B. Therefore, to improve the binding characteristics, the metal material 226 fills in the foregoing gap 224A. In this case, it is enough that part of the gap 224A is filled therewith, but the larger filling amount is preferable, since thereby the binding characteristics of the anode active material layer 22B are further improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material layer 22B as the foregoing gap 224A does. Therefore, to improve the binding characteristics, the metal material 226 fills in the foregoing gap 224B. In this case, it is enough that part of the gap 224B is filled therewith, but the larger filling amount is preferable, since thereby the binding characteristics of the anode active material layer 22B are further improved.

To prevent the fibrous minute projection (not shown) generated on the exposed face of the uppermost layer of the anode active material particles 221 from adversely affecting the performance of the secondary battery, the void 225 may have the metal material 226. More specifically, in the case where the anode active material particles 221 are formed by vapor-phase deposition method or the like, the fibrous minute projections are generated on the surface thereof, and thus the void 225 is generated between the projections. The void 225 causes increase of the surface area of the anode active material particles 221, and accordingly the amount of an irreversible coat formed on the surface is also increased, possibly resulting in lowering of progression of the electrode reaction. Therefore, to avoid the lowering of progression of the electrode reaction, the foregoing void 225 is filled with the metal material 226. In this case, it is enough at minimum that part of the void 225 is filled therewith, but the larger filling amount is preferable, since thereby the lowering of progression of the electrode reaction is further prevented. In FIGS. 6A and 6B, the metal material 226 is dotted on the surface of the uppermost layer of the anode active material particles 221, which means that the foregoing minute projection exists in the location where the metal material 226 is dotted. It is needless to say that the metal material 226 is not necessarily dotted on the surface of the anode active material particles 221, but may cover the entire surface thereof.

In particular, the metal material 226 that intrudes into the gap 224B has a function to fill in the void 225 in each layer. More specifically, in the case where the anode active material particles 221 are deposited several times, the foregoing minute projection is generated on the surface of the anode active material particle 221 for every deposition. Therefore, the metal material 226 fills in not only the gap 224B in each layer, but also the void 225 in each layer.

The metal material 226 is formed by, for example, at least one of vapor-phase deposition method and liquid-phase deposition method. Specially, the metal material 226 is preferably formed by liquid-phase deposition method. Thereby, the metal material 226 easily intrudes into the gaps 224A and 224B and the void 225. As the foregoing vapor-phase deposition method, for example, a method similar to the method of forming the anode active material layer 22B is cited. Further, as liquid-phase deposition method, for example, plating method such as electrolytic plating method and electroless plating method is cited. As liquid-phase deposition method, electrolytic plating method is preferable to electroless plating method, since thereby the metal material 226 more easily intrudes into the gaps 224A and 224B and the void 225.

In FIGS. 5A and 5B and 6A and 6B, the description has been given of a case that the anode active material particles have the multilayer structure, and the both gaps 224A and 224B exist in the anode active material layer 22B, and thus the anode active material layer 22B has the metal material 226 in the gaps 224A and 224B. Meanwhile, in the case where the anode active material particles have a single layer structure, and only the gap 224A exists in the anode active material layer 22B, the anode active material layer 22B has the metal material 226 only in the gap 224A.

Separator

The separator 23 is made of, for example, a porous film made of a synthetic resin such as polytetrafluoroethylene, polypropylene, and polyethylene, or a ceramic porous film. The separator 23 may have a structure in which two or more of the foregoing porous films are layered. Among them, the porous film made of polyolefin is preferable, since such a film has a superior short circuit preventive effect and is able to improve safety of the battery by shutdown effect. In particular, polyethylene is preferable as a material composing the separator 23, since polyethylene provides shutdown effect at from 100 deg C. to 160 deg C. and has superior electrochemical stability. Further, polypropylene is also preferable. In addition, as long as chemical stability is secured, a resin formed by copolymerizing or blending with polyethylene or polypropylene may be used.

Electrolyte

An electrolytic solution as a liquid electrolyte is impregnated in the separator 23. The electrolytic solution contains a liquid solvent, for example, a nonaqueous solvent such as an organic solvent and an electrolyte salt dissolved in the nonaqueous solvent. The secondary battery of the embodiment of the invention is characterized in that a borate is further contained. As in the foregoing description, a coat containing the borate is thereby formed on the surface of the anode active material particles, and the cycle characteristics of the battery is able to n be improved. The electrolytic solution containing the borate is applicable to the battery including the anode in which the coat containing the oxo acid salt is formed on the surface of the anode active material particles as described above.

As the borate, for example, lithium tetraborate ($Li_2B_4O_7$), lithium metaborate ($LiBO_2$), lithium tetrafluoroborate ($LiBF_4$), sodium tetraborate, sodium metaborate, potassium tetraborate, potassium metaborate, tetraethylammonium tetraborate, tetraethylammonium metaborate and the like are cited. In particular, lithium tetraborate, lithium metaborate, and lithium tetrafluoroborate are preferable. A plurality of these borates may be used by mixture. The content of the borate in the electrolytic solution is preferably in the range from 0.01 wt % to 5 wt %, and more preferably in the range from 0.1 wt % to 3 wt %. In such a range, the characteristics are further improved.

The nonaqueous solvent in the electrolytic solution is made of a nonaqueous compound having an intrinsic viscosity of 10.0 mPa·s or less at 25 deg C. The inherent viscosity in a state that the electrolyte salt is dissolved may be 10.0 mPa·s or less. When the solvent is prepared by mixing a plurality of nonaqueous compounds, the inherent viscosity in a state that the plurality of nonaqueous compounds are mixed may be 10.0 mPa·s or less. As the solvent, a mixture of a high dielectric constant solvent having a specific inductive of 30 or more and a low viscosity solvent having a viscosity of 1 mPa·s or less is preferably used. Thereby, high ion conductivity is obtained.

Specifically, the nonaqueous solvent preferably contains at least one selected from the group consisting of a chain ester carbonate having halogen as an element shown in the following Formula 1 and a cyclic ester carbonate having halogen as an element shown in the following Formula 2. Thereby, higher effects are obtained.

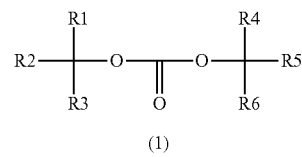

Formula 1

(1)

In the foregoing Formula 1, R1 to R6 represent a hydrogen group, a halogen group, an alkyl group, or an alkyl halide group. R1 to R6 may be identical or different. However, at least one of R1 to R6 has halogen as an element.

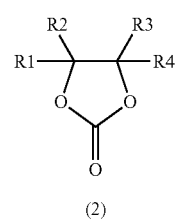

Formula 2

(2)

In the foregoing Formula 2, R1 to R4 represent a hydrogen group, a halogen group, an alkyl group, or an alkyl halide group. R1 to R4 may be identical or different. However, at least one of R1 to R4 has halogen as an element.

The chain ester carbonate having halogen as an element shown in Formula 1 is fluoromethylmethyl carbonate, bis(fluoromethyl)carbonate, difluoromethylmethyl carbonate or the like. One thereof may be used singly, or a plurality thereof may be used by mixture.

As the cyclic ester carbonate having halogen as an element shown in Formula 2, in the case where R1 to R4 are an alkyl group or an alkyl halide group, a compound having carbon number of about 1 or 2 is preferable. Specifically, the compounds shown in the following Formulas 2-1 to 2-12 and 2-13 to 2-21 are cited.

That is, 4-fluoro-1,3-dioxolane-2-one shown in Formula 2-1, 4-chloro-1,3-dioxolane-2-one of Formula 2-2, 4,5-difluoro-1,3-dioxolane-2-one of Formula 2-3, tetrafluoro-1,3-dioxolane-2-one of Formula 2-4, 4-fluoro-5-chloro-1,3-dioxolane-2-one of Formula 2-5, 4,5-dichloro-1,3-dioxolane-2-one of Formula 2-6, tetrachloro-1,3-dioxolane-2-one of Formula 2-7, 4,5-bistrifluoromethyl-1,3-dioxolane 2-one of Formula 2-8, 4-trifuloromethyl-1,3-dioxolane-2-one of Formula 2-9, 4,5-difluoro-4,5-dimethyl-1,3-dioxolane-2-one of Formula 2-10, 4-methyl-5,5-difluoro-1,3-dioxolane-2-one of Formula 2-11, 4-ethyl-5,5-difluoro-1,3-dioxolane-2-one of Formula 2-12 and the like are cited Further, 4-trifluoromethyl-5-fluoro-1,3-dioxolane-2-one of Formula 2-13, 4-trifluoromethyl-5-methyl-1,3-dioxolane-2-one of Formula 2-14, 4-fluoro-4,5-dimethyl-1,3-dioxolane-2-one of Formula 2-15, 4,4-difluoro-5-(1,1-difluoroethyl)-1,3-dioxolane-2-one of Formula 2-16, 4,5-dichloro-4,5-dimethyl-1,3-dioxolane-2-one of Formula 2-17, 4-ethyl-5-fluoro-1,3-dioxolane-2-one of Formula 2-18, 4-ethyl-4,5-difluoro-1,3-dioxolane-2-one of Formula 2-19, 4-ethyl-4,5,5-trifluoro-1,3-dioxolane-2-one of Formula 2-20, 4-fluoro-4-methyl-1,3-dioxolane-2-one of Formula 2-21 and the like are cited.

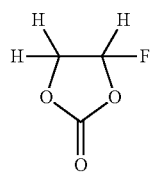 (2-1)
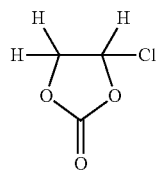 (2-2)
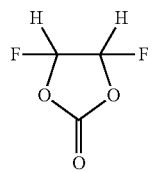 (2-3)
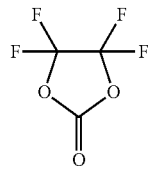 (2-4)
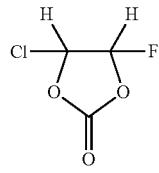 (2-5)
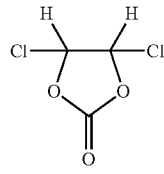 (2-6)
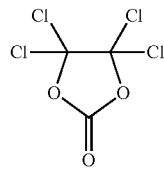 (2-7)
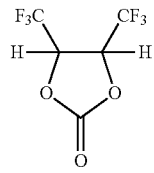 (2-8)
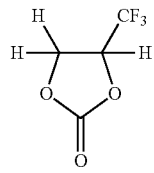 (2-9)
-continued
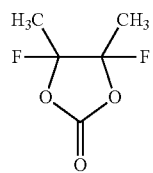 (2-10)
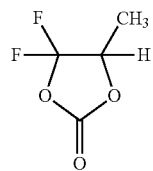 (2-11)
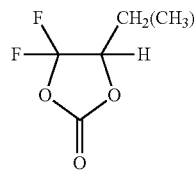 (2-12)
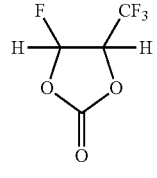 (2-13)
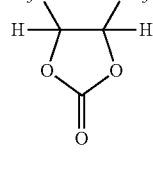 (2-14)
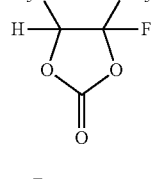 (2-15)
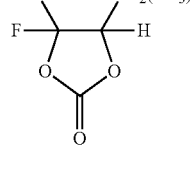 (2-16)
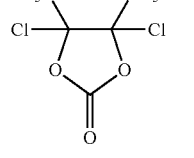 (2-17)
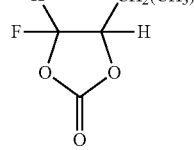 (2-18)

-continued

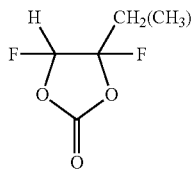

(2-19)

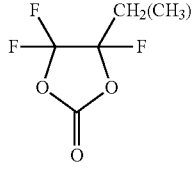

(2-20)

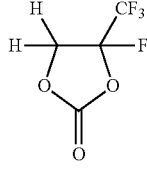

(2-21)

One of the foregoing may be used singly, or two or more thereof may be used by mixture. Specially, as the chain ester carbonate having halogen as an element, 4-fluoro-1,3-dioxolane-2-one of Formula 2-1 is preferable, and 4,5-difluoro-1,3-dioxolane-2-one of Formula 2-3 is more preferable, since thereby such a compound is easily available and provides higher effects. In particular, as 4,5-difluoro-1,3-dioxolane-2-one, a trans isomer is preferable to a sis isomer to obtain higher effects.

Further, the solvent preferably contains a cyclic ester carbonate having an unsaturated bond, since thereby higher effects are obtained. The cyclic ester carbonate having an unsaturated bond is vinylene carbonate, vinyl ethylene carbonate or the like. One of the foregoing may be used singly, a plurality thereof may be used by mixture. Specially, the cyclic ester carbonate having an unsaturated bond preferably contains vinylene carbonate, since thereby higher effects are obtained. In particular, in the case where the solvent contains the chain ester carbonate having halogen as an element or the cyclic ester carbonate having halogen as an element described above, and the solvent further contains the cyclic ester carbonate having an unsaturated bond, higher effects are obtained.

Further, the solvent preferably contains sultone (cyclic ester sulfonate), since thereby the cycle characteristics are improved and swollenness of the secondary battery is prevented. As the sultone, for example, propane sultone, propene sultone or the like is cited. One thereof may be used singly, or a plurality thereof may be used by mixture.

Further, the solvent preferably contains an acid anhydride, since thereby the cycle characteristics are improved. As the acid anhydride, for example, succinic anhydride, glutaric anhydride, maleic anhydride, sulfobenzoic acid anhydride, sulfopropionic acid anhydride, sulfobutyric acid anhydride, ethane disulfonic acid anhydride, propane disulfonic acid anhydride, benzene disulfonic acid anhydride and the like are cited. One thereof may be used singly, or a plurality thereof may be used by mixture. Specially, succinic anhydride, sulfobenzoic acid anhydride, or sulfopropionic acid anhydride is preferable, since thereby high effects are obtained. The content of the acid anhydride in the solvent is, for example, in the range from 0.5 wt % to 3 wt %.

The electrolytic solution may contain a nonaqueous solvent other than the foregoing nonaqueous solvents. Other solvents include, for example, an ester carbonate solvent such as ethylene carbonate, propylene carbonate, butylene carbonate, dimethyl carbonate, diethyl carbonate, ethyl methyl carbonate, and methyl propyl carbonate since thereby superior capacity characteristics, superior cycle characteristics, and superior storage characteristics are obtained. Specially, a mixture of a high viscosity solvent such as ethylene carbonate and propylene carbonate and a low viscosity solvent such as dimethyl carbonate, ethyl methyl carbonate, and diethyl carbonate is preferable. Thereby, the dissociation property of the electrolyte salt and the ion mobility are improved, and thus higher effects are obtained.

The electrolyte salt in the electrolytic solution contains, for example, a light metal salt such as a lithium salt. The lithium salt is lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), lithium bromide (LiBr) or the like. Such a lithium salt may be used singly, or a plurality thereof may be used by mixture. Specially, the electrolyte salt preferably contains lithium hexafluorophosphate, since thereby, the internal resistance is lowered, and thus superior capacity characteristics and superior cycle characteristics are obtained.

The electrolytic solution preferably further contains at least one of the light metal salts shown in the following Formula 3, since thereby higher effects are obtained. The compound shown in Formula 3 is preferably the compound shown in the following Formula 31. When the electrolyte salt contains the foregoing lithium hexafluorophosphate ($LiPF_6$) or the like, and the electrolyte salt further contains the compound shown in Formula 3 or Formula 31, significantly high effects are obtained.

Formula 3

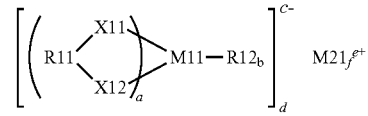

(3)

In Formula 3, R11 represents —C(=O)—R21-C(=O)— group (R21 represents an alkylene group, an alkylene halide group, an arylene group, or an arylene halide group) —C(=O)—C(R23)(R24)- group (R23 and R24 represent hydrogen, halogen, an alkyl group, an alkyl halide group, an aryl group, or an aryl halide group), or —C(=O)—C(=O)— group;

R12 represents a halogen group, an alkyl group, an alkyl halide group, an aryl group, or an aryl halide group;

X11 and X12 respectively represent oxygen (O) or sulfur (S);

M11 represents a transition metal element, or a Group 3B element, a Group 4B element, or a Group 5B element in the short period periodic table;

M21 represents a Group 1A element or a Group 2A element in the short period periodic table;

a represents one of integer numbers 1 to 4;

b represents one of integer numbers 0 to 8; and c, d, e, and f respectively represent one of integer numbers 1 to 3.

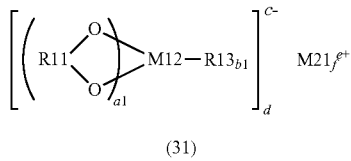

Formula 31

(31)

In Formula 31, R11 represents —C(=O)—R21-C(=O)— group (R21 represents an alkylene group, an alkylene halide group, an arylene group, or an arylene halide group), —C(=O)—C(=O)— group, or —C(=O)—C(R22)$_2$— group (R22 represents hydrogen, halogen, an alkyl group, an alkyl halide group, an aryl group, or an aryl halide group);

R13 represents halogen;

M12 represents phosphorus (P) or boron (B);

M21 represents a Group 1A element or a Group 2A element in the short period periodic table or aluminum;

a represents one of integer numbers 1 to 4;

b1 represents one of integer numbers 0, 2 and 4; and c, d, e, and f respectively represent one of integer numbers 1 to 3.

As the compounds shown in Formula 3 or Formula 31, the compounds shown in the following Formulas 3-1 to 3-6 are cited. That is, lithium difluoro[oxalate-O,O']borate of Formula 3-1, lithium difluoro bis[oxalate-O,O']phosphate of Formula 3-2, lithium difluoro[3,3,3-trifluoro-2-oxide-2-trifluoromethyl propionate(2-)-O,O']borate of Formula 3-3, lithium bis[3,3,3-trifluoro-2-oxide-2-trifluoromethyl propionate(2-)-O,O']borate of Formula 3-4, lithium tetrafluoro [oxalate-O,O']phosphate of Formula 3-5, lithium bis[oxalate-O,O']borate of Chemical formula 3-6 and the like are cited. One thereof may be used singly, or a plurality thereof may be used by mixture. Specially, the electrolyte salt preferably contains lithium difluoro[oxalate-O,O']borate of Formula 3-1 or lithium bis[oxalate-O,O']borate of Chemical formula 3-6, since thereby higher effects are obtained.

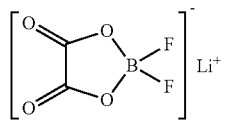

(3-1)

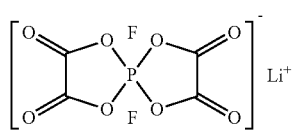

(3-2)

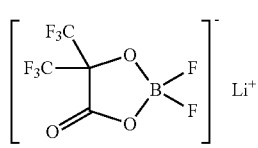

(3-3)

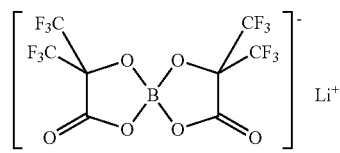

(3-4)

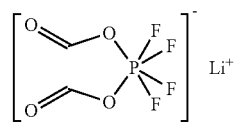

(3-5)

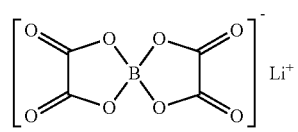

(3-6)

Further, the electrolyte salt preferably contains the compound shown in Formulas 4 to 6, since thereby higher effects are obtained. When the electrolyte salt contains the foregoing lithium hexafluorophosphate or the like, and the electrolyte salt further contains the compound shown in the following Formulas 4 to 6, significantly high effects are obtained.

$$LiN(C_mF_{2m+1}SO_2)(C_nF_{2n+1}SO_2)$$ Formula 4

In Formula 4, m and n represent an integer number of 1 or more. m and n may be identical or different.

As a specific example of the chain compound shown in Chemical formula 4, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl) (pentafluoroethanesulfonyl)imide (LiN(CF$_3$SO$_2$)(C$_2$F$_5$SO$_2$)), lithium (trifluoromethanesulfonyl) (heptafluoropropanesulfonyl)imide (LiN(CF$_3$SO$_2$)(C$_3$F$_7$SO$_2$)), lithium (trifluoromethanesulfonyl) (nonafluorobutanesulfonyl)imide (LiN(CF$_3$SO$_2$)(C$_4$F$_9$SO$_2$)) and the like are cited. One thereof may be used singly, or a plurality thereof may be used by mixture.

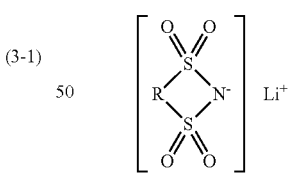

Formula 5

(5)

In Formula 5, R represents a straight-chain or a branched perfluoroalkylene group having a carbon number of 2 to 4.

As a specific example of the cyclic compound shown in Formula 5, the compounds shown in Formulas 5-1 to 5-4 are cited. That is, lithium 1,2-perfluoroethanedisulfonylimide of Formula 5-1, lithium 1,3-perfluoropropanedisulfonylimide of Formula 5-2, lithium 1,3-perfluorobutanedisulfonylimide of Formula 5-3, lithium 1,4-perfluorobutanedisulfonylimide shown of Formula 5-4 or the like is cited. One thereof may be used singly, or a plurality thereof may be used by mixture. Specially, the electrolyte salt preferably contains lithium 1,3-perfluoropropanedisulfonylimide of Formula 5-2, since thereby higher effects are obtained.

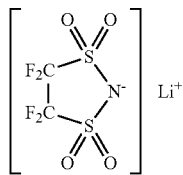
(5-1)

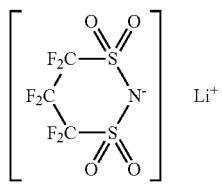
(5-2)

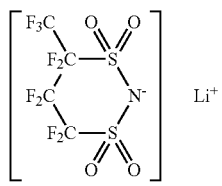
(5-3)

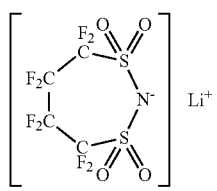
(5-4)

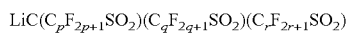
Formula 6

In Formula 6, p, q, and r represent an integer number of 1 or more. p, q, and r may be identical or different.

As a specific example of the chain compound shown in Chemical formula 6, lithium tris(trifluoromethanesulfonyl) methyde ($LiC(CF_3SO_2)_3$) or the like is cited.

The content of the electrolyte salt is preferably in the range from 0.3 mol/kg to 3.0 mol/kg to the solvent. If the content is out of the foregoing range, there is a possibility that the ion conductivity is extremely lowered and thus capacity characteristics and the like are not able to be obtained sufficiently.

As described above, according to the electrolytic solution containing the borate together with the solvent and the electrolyte salt, the coat containing the borate is easily formed on the electrode compared to a case not containing the borate. Thereby, decomposition reaction of the electrolytic solution solvent is prevented, and thus the cycle characteristics in an electrochemical device in such a battery are improved. Further, when the content of the borate in the electrolytic solution is in the range from 0.01 wt % to 5 wt %, the characteristics are further improved.

In particular, when the solvent contains the chain ester carbonate having halogen as an element shown in the foregoing Formula 1 or the cyclic ester carbonate having halogen as an element shown in the foregoing Formula 2, and further contains the ester carbonate having an unsaturated bond such as vinylene carbonate, the characteristics are further improved. Further, when the electrolyte salt contains lithium hexafluorophosphate or the like, and further contains the compound shown in the foregoing Formulas 3 to 6, the characteristics are further improved.

Time of Flight Secondary Ion Mass Spectrometry: TOF-SIMS

The anode and the secondary battery of the embodiment of the invention have a peak of at least one or more secondary ions selected from the group consisting of positive secondary ions of $Li_2PO_2F_2^+$, $Li_3PO_3F^+$, and $Li_2BO_2^+$ and negative secondary ions of $PO_2F_2^-$, $PO_3F^-$, $LiPO_3F^-$, $BO^-$, $BO_2^-$, and $LiB_2O_4^-$ in surface analysis by Time of Flight Secondary Ion Mass Spectrometry (TOF-SIMS) of the anode.

In the anode and the secondary battery of the embodiment of the invention, it is conceivable that the oxo acid salt on the surface of the anode active material particles or the borate and the electrolyte salt in the electrolytic solution initiate electrochemical reaction in the first charge and discharge, and thereby a stable protective film to protect the electrode is formed. The foregoing peak of the secondary ion indicates that the protective film is formed on the anode. Further, when a coat containing lithium fluorophosphate or lithium borate is previously formed on the surface of the anode active material particles, similar effects are obtained. The coat may be formed by a liquid-phase deposition method such as coating method and dip coating method.

The ratio of the positive secondary ion of $Li_2PO_2F_2^+$ to the active material element peak $Si^+$ intensity ($Li_2PO_2F_2^+/Si^+$) is preferably 0.4 or more, and more preferably 1.0 or more. When the peak ratio is 0.4 or more, the cycle characteristics are further improved.

The ratio of the positive secondary ion of $Li_3PO_3F^+$ to the active material element peak $Si^+$ intensity ($li_3po_3f^+/Si^+$) is preferably 0.5 or more, and more preferably 1.2 or more. When the peak ratio is 0.5 or more, the cycle characteristics are further improved.

The ratio of the positive secondary ion of $Li_2BO_2^+$ to the active material element peak $Si^+$ intensity ($Li_2BO_2^+/Si^+$) is preferably 0.5 or more, and more preferably 1.2 or more. When the peak ratio is 0.5 or more, the cycle characteristics are further improved.

Manufacturing Method

The first secondary battery may be manufactured, for example, by the following procedure.

The cathode may be formed, for example, by the following method. First, a cathode active material, an electrical conductor, and a binder are mixed to prepare a cathode mixture, which is dispersed in a solvent such as N-methyl-2-pyrrolidone to form paste cathode mixture slurry. Subsequently, the cathode current collector 21A is coated with the cathode mixture slurry, and the solvent is dried. After that, the resultant is compression-molded by a rolling press machine or the like to form the cathode active material layer 21B. Accordingly, the cathode 21 is formed.

Further, the anode may be formed, for example, by the following method. First, an anode active material containing at least one of silicon and tin as an element, an electrical conductor, and a binder are mixed to prepare an anode mixture, which is dispersed in a solvent such as N-methyl-2-pyrrolidone to form paste anode mixture slurry. Next, the anode current collector 22A is coated with the anode mixture slurry, and the resultant is dried. After that, the resultant is compression-molded to form the anode active material layer 22B containing the anode active material particles composed of the foregoing anode active material.

Subsequently, in the case where a coat is formed by precipitating the oxo acid salt on the surface of the anode active material particles, an oxo acid salt solution is prepared, for example, dip coating method is provided to obtain the anode 22. Accordingly, a favorable protective film is formed from the oxo acid salt, and decomposition of the electrolytic solution is prevented.

After that, the cathode lead 25 is attached to the cathode current collector 21A by welding or the like, and the anode lead 26 is attached to the anode current collector 22A by welding or the like. Subsequently, the cathode 21 and the anode 22 are spirally wound with the separator 23 in between. The end of the cathode lead 25 is welded to the safety valve mechanism 15, and the end of the anode lead 26 is welded to the battery can 11. After that, the spirally wound cathode 21 and the spirally wound anode 22 are sandwiched between the pair of insulating plates 12 and 13 and contained in the battery can 11. After the cathode 21 and the anode 22 are contained in the battery can 11, the electrolytic solution containing the borate is injected into the battery can 11 and impregnated in the separator 23. After that, at the open end of the battery can 11, the battery cover 14, the safety valve mechanism 15, and the PTC device 16 are fixed by being caulked with the gasket 17. The secondary battery shown in FIG. 1 is thereby completed. When the coat containing the borate is formed on the surface of the anode active material particles, the coat may be formed in the stage of forming the anode, or the borate may be contained in the electrolytic solution.

In the secondary battery, when charged, for example, lithium ions are extracted from the cathode 21 and inserted in the anode 22 through the electrolytic solution. Meanwhile, when discharged, for example, lithium ions are extracted from the anode 22, and inserted in the cathode 21 through the electrolytic solution. Since the surface of the anode active material particles has the oxo acid salt and the borate, a favorable protective film is formed and the chemical stability is improved. Therefore, decomposition reaction of the electrolytic solution is prevented, and the discharge capacity retention ratio is improved.

In the foregoing embodiment, a description has been given with the specific examples of the cylindrical battery as an example. However, this battery is not limited thereto, and is similarly applicable to a secondary battery having various shapes and sizes such as a coin type battery, a square battery, a button type battery, a battery using a metal container or the like for a package member, a thin battery, and a battery using a laminated film for a package member. A description will be given of other embodiments.

First Embodiment: Second Battery

Figure 7:
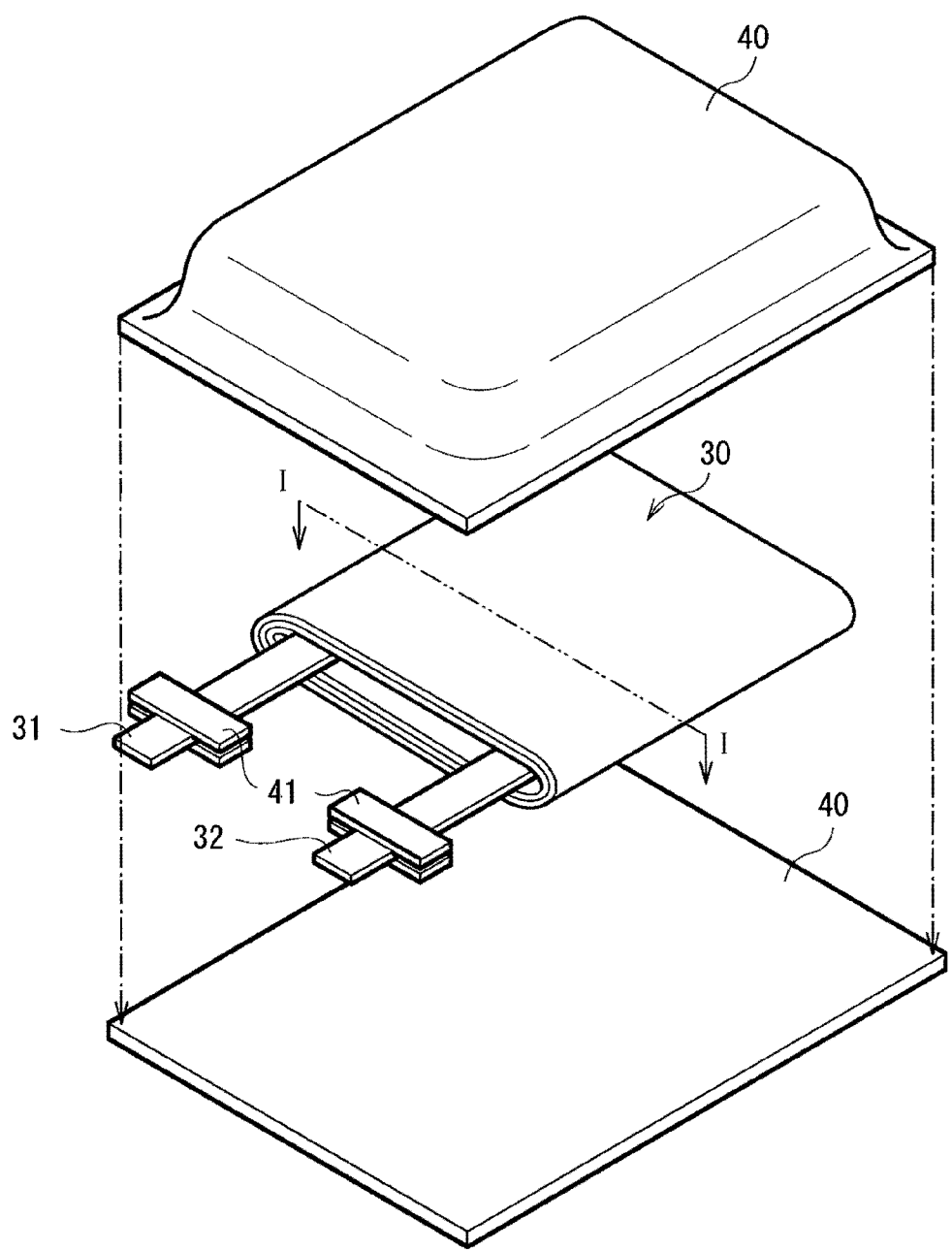
FIG. 7 is an exploded perspective view showing a structure of a secondary battery according to another embodiment of the invention.

FIG. 7 shows a structure of a second secondary battery according to the first embodiment of the invention. The secondary battery is a so-called laminated film secondary battery. In the secondary battery, a spirally wound electrode body 30 on which a cathode lead 31 and an anode lead 32 are attached is contained in a film package member 40.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless and are respectively in the shape of a thin plate or mesh.

The package member 40 is made of a rectangular aluminum laminated film in which, for example, a nylon film, an aluminum foil, and a polyethylene film are bonded together in this order. The package member 40 has, for example, a structure in which the polyethylene film side is opposed to the spirally wound electrode body 30, and respective outer edges are bonded to each other by fusion bonding or an adhesive. An adhesive film 41 to protect from entering of outside air is inserted between the package member 40 and the cathode lead 31, the anode lead 32. The adhesive film 41 is made of a material having contact characteristics to the cathode lead 31 and the anode lead 32. Examples of such a material include a polyolefin resin such as polyethylene, polypropylene, modified polyethylene, and modified polypropylene.

The package member 40 may be made of a laminated film having other structure, a polymer film such as polypropylene, or a metal film, instead of the foregoing aluminum laminated film.

Figure 8:
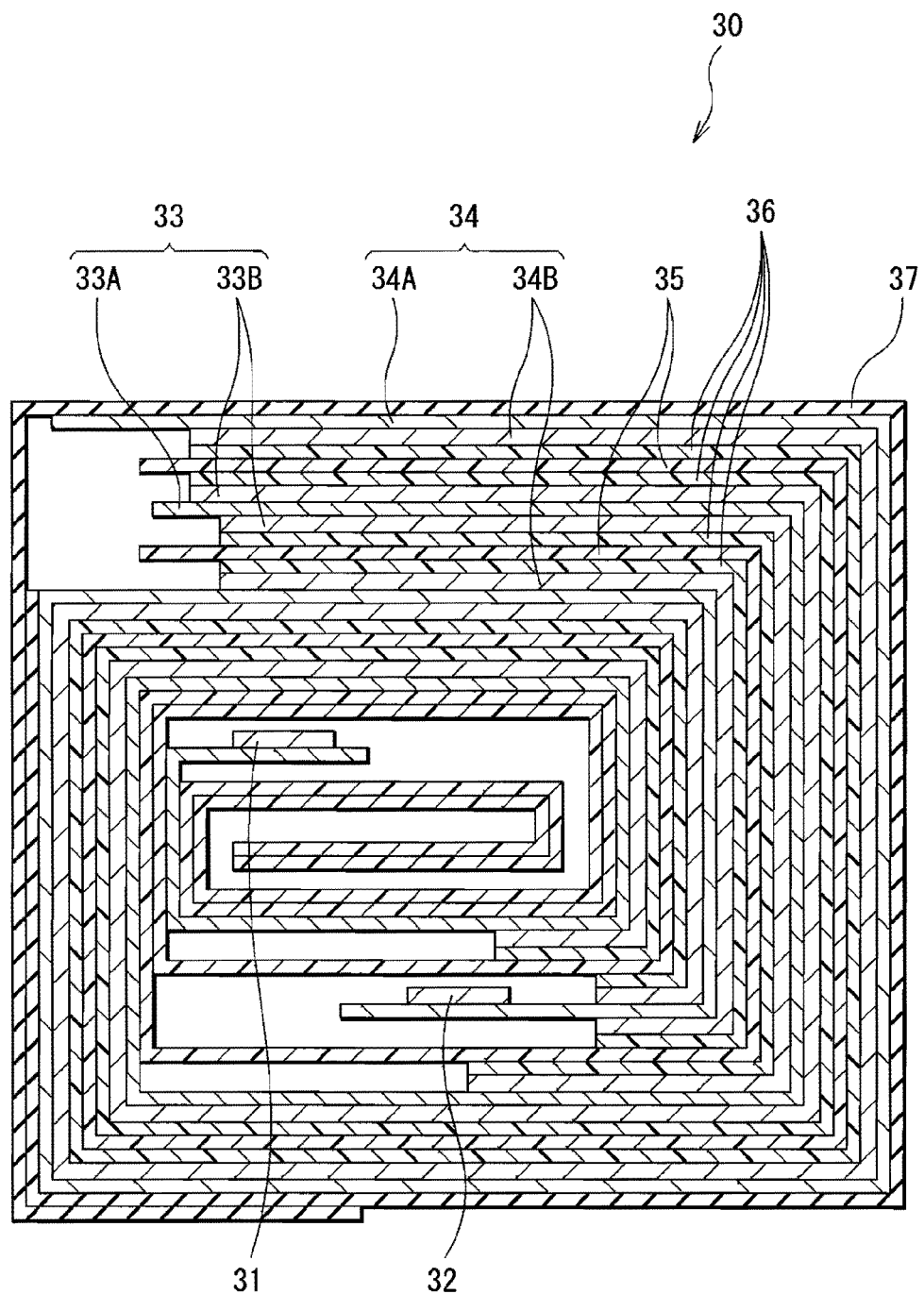
FIG. 8 is a cross section view taken along line I-I of the spirally wound electrode body shown in FIG. 7.

FIG. 8 shows a cross sectional structure taken along line I-I of the spirally wound electrode body 30 shown in FIG. 7. In the spirally wound electrode body 30, a cathode 33 and an anode 34 are layered with a separator 35 and an electrolyte layer 36 in between and then spirally wound. The outermost periphery thereof is protected by a protective tape 37.

The cathode 33 has a structure in which, for example, a cathode active material layer 33B is provided on the both faces of a cathode current collector 33A. The structures of the cathode current collector 33A and the cathode active material layer 33B are similar to those of the cathode current collector 21A and the cathode active material layer 21B in the first battery.

The anode 34 has a structure in which, for example, an anode active material layer 34B is provided on the both faces of an anode current collector 34A. The structure of the anode current collector 34A is similar to that of the anode current collector 22A in the first battery. The anode active material layer 34B contains the anode active material particles (not shown) composed of the foregoing anode active material as in the anode active material layer 22B in the first battery, and has the oxo acid salt on the surface of the anode active material particles. Thereby, the secondary battery allows to improve the chemical stability of the anode 34 to improve the discharge capacity retention ratio as the first battery. The cathode 33 and the anode 34 are arranged so that the anode active material layer 34B opposes to the cathode active material layer 33B.

The separator 35 has a structure similar to that of the separator 23 in the first battery.

The electrolyte layer 36 is so-called gelatinous, containing an electrolytic solution and a polymer compound that functions as holding body holding the electrolytic solution. The gel electrolyte is preferable, since thereby high ion conductivity is obtained and liquid leakage is prevented. The electrolytic solution has a structure similar to that in the first embodiment. However, a solvent of the electrolytic solution in this case means a wide concept that includes not only a liquid solvent, but also a solvent having ion conductivity capable of dissociating an electrolyte salt. Thus, when a polymer compound having ion conductivity is used, the polymer compound is also included as the solvent. As the polymer compound holding the electrolytic solution, for example, an ether polymer compound such as polyethylene oxide and a cross-linked body containing polyethylene oxide, an ester polymer compound such as polymethacrylate or an acrylate polymer compound, or a polymer of vinylidene fluoride such as polyvinylidene fluoride and a copolymer of vinylidene fluoride and hexafluoropropylene is cited. One thereof may be used singly, or a plurality thereof may be used by mixture. In particular, in terms of redox stability, the fluorinated polymer compound such as the polymer of vinylidene fluoride or the like is desirable.

Manufacturing Method

The second secondary battery may be manufactured, for example, as follows.

First, in the same manner as that of the foregoing method of manufacturing the first secondary battery, the cathode 33 and the anode 34 are formed, the cathode 33 and the anode 34 are respectively coated with a precursor solution containing an electrolytic solution, a polymer compound, and a mixed solvent, and the mixed solvent is volatilized to form the electrolyte layer 36. Next, the cathode lead 31 is attached to the cathode current collector 33A and the anode lead 32 is attached to the anode current collector 34A. Subsequently, the cathode 33 and the anode 34 provided with the electrolyte layer 36 are layered with the separator 35 in between to obtain a laminated body. After that, the laminated body is spirally wound in the longitudinal direction, the protective tape 37 is adhered to the outermost periphery thereof to form the spirally wound electrode body 30. After that, for example, after the spirally wound electrode body 30 is sandwiched between the package members 40, outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery shown in FIG. 7 and FIG. 8 is completed.

Alternatively, the second battery may be fabricated as follows. First, in the same manner as that of the foregoing method of manufacturing the first battery, the cathode 33 and the anode 34 are formed, the cathode lead 31 and the anode lead 32 are attached to the cathode 33 and the anode 34, respectively. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Next, the spirally wound body is sandwiched between the package members 40, the outermost peripheries except for one side are bonded by thermal fusion bonding to obtain a pouched state, and the spirally wound body is contained in the package member 40. Subsequently, a composition of matter for electrolyte containing an electrolytic solution, a monomer as a raw material for the polymer compound, and if necessary other material such as a polymerization initiator and a polymerization inhibitor is prepared, which is injected into the package member 40. After that, the opening of the package member 40 is hermetically sealed by thermal fusion bonding. After that, the monomer is thermally polymerized to obtain a polymer compound. Thereby, the gel electrolyte layer 36 is formed. Accordingly, the secondary battery shown in FIG. 7 and FIG. 8 is assembled.

The second secondary battery works as the first battery does, and provides effects similar to those of the first battery.

Second Embodiment

A description will be given in detail of a secondary battery according to a second embodiment of the invention. The secondary battery according to the second embodiment has a structure, an action, and effects similar to those of the first embodiment, except that the anodes 22 and 34 have different structure, and may be manufactured in the same manner as that of the first embodiment. Therefore, the description will be given with reference to FIG. 1, FIG. 2, FIG. 7, and FIG. 8, the same referential symbols are applied to corresponding elements, and description for the same sections will be omitted.

As in the first embodiment, the anodes 22 and 34 have a structure in which the anode active material layers 22B and 34B are provided on the both faces of the anode current collectors 22A and 34A. As in the first embodiment, the anode active material layers 22B and 34B contain the anode active material containing at least one of a simple substance and a compound of silicon or tin. As in the first embodiment, the anode active material layers 22B and 34B contain the anode active material particles composed of the foregoing anode active material, and have the oxo acid salt on the surface. Thereby, in the secondary battery, as in the first embodiment, the chemical stability of the anodes 22 and 34 is improved and the discharge capacity retention ratio is improved as well.

Further, the anode active material layers 22B and 34B are formed by, for example, using vapor-phase deposition method, liquid-phase deposition method, firing method, or a combination of two or more of these methods. The anode active material layers 22B and 34B are preferably alloyed with the anode current collectors 22A and 34A in at least part of the interface thereof. Specifically, at the interface thereof, the element of the anode current collectors 22A and 34A is preferably diffused in the anode active material layers 22B and 34B; or the element of the anode active material layers 22B and 34B is preferably diffused in the anode current collectors 22A and 34A; or these elements are preferably diffused in each other. Thereby, destruction due to expansion and shrinkage of the anode active material layers 22B and 34B associated with charge and discharge is prevented, and the electron conductivity between the anode active material layers 22B and 34B and the anode current collectors 22A and 34A is improved.

As vapor-phase deposition method, for example, physical deposition method or chemical deposition method may be used. Specifically, vacuum evaporation method, sputtering method, ion plating method, laser ablation method, thermal Chemical Vapor Deposition (CVD) method, plasma CVD method, spraying method or the like is cited. As liquid-phase deposition method, a known technique such as electrolytic plating and electroless plating may be used. Firing method is, for example, a method in which a particulate anode active material is mixed with a binder or the like, the resultant mixture is dispersed in a solvent, coating is provided, and then heat treatment is provided at a temperature higher than the melting point of the binder or the like. For firing method, a known technique such as atmosphere firing method, reactive firing method, and hot press firing method is cited.

EXAMPLES

Specific examples of the invention will be described in detail.

Forming a Poly Acid Salt Coat by Dipping Treatment

Examples 1-1 to 1-9

Figure 9:
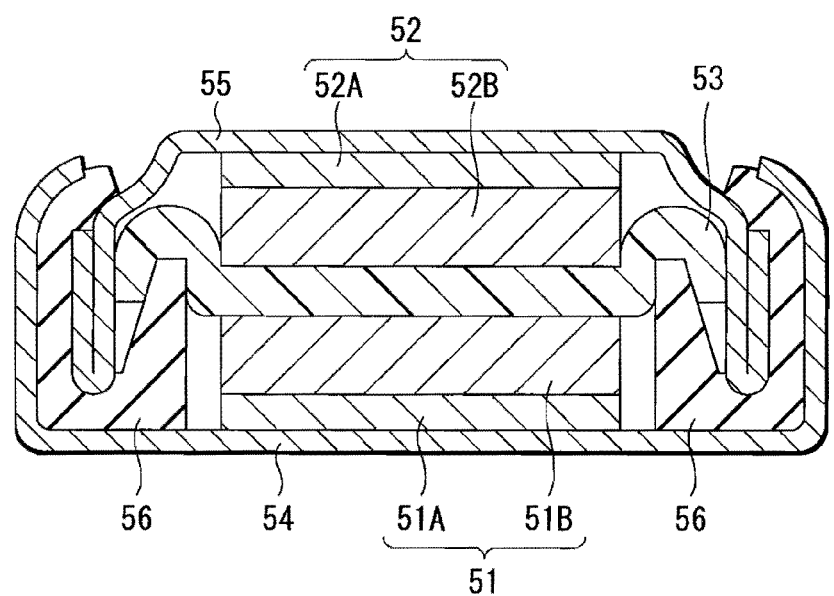
FIG. 9 is a cross section view showing a structure of a coin type secondary battery fabricated in examples.

Coin type secondary batteries as shown in FIG. 9 were fabricated. In the secondary battery, a cathode 51 and an anode 52 were layered with a separator 53 impregnated with an electrolytic solution in between, and the resultant laminated body was sandwiched between a package can 54 and a package cup 55 and was caulked with a gasket 56.

First, lithium carbonate ($Li_2CO_3$) and cobalt carbonate ($CoCO_3$) were mixed at a molar ratio of $Li_2CO_3$:$CoCO_3$=0.5:1. After that, the mixture was fired in the air at 900 deg C. for 5 hours. Thereby, lithium cobalt complex oxide ($LiCoO_2$) was obtained as a cathode active material. Next, 91 parts by weight of the lithium cobalt complex oxide, 6 parts by weight of graphite as an electrical conductor, and 3 parts by weight of polyvinylidene fluoride as a binder were mixed to prepare a cathode mixture. After that, the cathode mixture was dispersed in N-methyl-2-pyrrolidone as a solvent to obtain cathode mixture slurry. Subsequently, a cathode current collector 51A made of an aluminum foil being 20 μm thick was uniformly coated with the cathode mixture slurry, which was dried. After that, the resultant was compression-molded to form a cathode active material layer 51B. After that, the resultant was punched out into a pellet being 15.5 mm in diameter to form the cathode 51.

Next, an anode active material layer 52B was formed on an anode current collector 52A made of a copper foil being 10 μm thick by evaporating silicon by electron beam evaporation method. After that, the resultant was punched out into a pellet being 16 mm in diameter (pellet A).

Further, as an anode material, artificial graphite powder was prepared. 90 parts by weight of the artificial graphite powder and 10 parts by weight of polyvinylidene fluoride as a binder were mixed to prepare an anode mixture. Next, the anode mixture was dispersed in N-methyl-2-pyrrolidone as a solvent to obtain anode mixture slurry. After that, the both faces of the anode current collector 52A made of a strip-shaped copper foil being 15 μm thick were uniformly coated with the anode mixture slurry, which was dried. After that, the resultant was compression-molded by a rolling press machine to form the anode active material layer 52B. Subsequently, the resultant was punched out into a pellet being 16 mm in diameter (pellet B).

Next, the formed cathode 51 and the formed anode 52 were laid over the package can 54 with the separator 53 made of a microporous polypropylene film in between. An electrolytic solution was injected thereon, the package cup 55 was laid thereon, the resultant was caulked and thereby hermetically sealed. Accordingly, the secondary battery was fabricated. As the electrolytic solution, a solution in which the solvent shown in Table 1 was used and lithium hexafluorophosphate as an electrolyte salt was dissolved therein at a concentration of 1 mol/dm$^3$ was used.

In Examples 1-1, 1-3, and 1-4, the foregoing pellet A formed by using silicon as an anode active material was dipped into a 2 wt % lithium tetraborate aqueous solution for several seconds, the resultant was taken out and dried, and thereby lithium tetraborate was provided on the surface of the anode active material particles composed of silicon to form the anode 52.

In Example 1-2, the pellet A was dipped into a 3 wt % lithium metaborate aqueous solution for several seconds, the resultant was taken out and dried, and thereby lithium metaborate was provided on the surface of the anode active material particles composed of silicon to form the anode 52.

In Example 1-5, the pellet A was dipped into a supermatent of a solution in which lithium carbonate was suspended in 2 wt % lithium tetraborate aqueous solution for several seconds, the resultant was taken out and dried, and thereby lithium tetraborate and lithium carbonate were provided on the surface of the anode active material particles composed of silicon to form the anode 52.

In Example 1-6, the pellet A was dipped into a supermatent of a solution in which lithium fluoride was suspended in 2 wt % lithium tetraborate aqueous solution for several seconds, the resultant was taken out and dried, and thereby lithium tetraborate and lithium fluoride were provided on the surface of the anode active material particles composed of silicon to form the anode 52.

In Example 1-7, the pellet A was dipped into a solution in which boric acid as an anion trapping agent was dissolved in hydrofluosilic acid for 3 hours, and thereby an oxide-containing film composed of silicon dioxide (SiO$_2$) was precipitated. The concentrations of hydrofluosilic acid and boric acid were respectively 2 mol/dm$^3$ and 0.028 mol/dm$^3$. After that, the resultant was washed with water, and dried under the reduced pressure. The resultant was dipped into a 2 wt % lithium tetraborate aqueous solution, taken out and dried, and thereby lithium tetraborate was provided on the surface of the anode active material particles composed of silicon to form the anode 52.

In Example 1-8, the pellet A was dipped into a solution in which boric acid as an anion trapping agent was dissolved in hydrofluosilic acid for 3 hours, and thereby an oxide-containing film composed of silicon dioxide (SiO$_2$) was precipitated. After that, the resultant was washed with water, and dried under the reduced pressure. The resultant was dipped into a supermatent of a solution in which lithium carbonate was suspended in 2 wt % lithium tetraborate aqueous solution for several seconds, taken out and dried, and thereby lithium tetraborate and lithium carbonate were provided on the surface of the anode active material particles composed of silicon to form the anode 52.

In Example 1-9, cobalt was fixed on the surface of the pellet A by electrolytic plating. At that time, a cobalt plating solution manufactured by Japan Pure Chemical Co., Ltd. was used. While air was supplied to the plating solution, plating reaction was progressed. The current density was in the range from 2 A/dm$^2$ to 5 A/dm$^2$, and the plating rate was 10 nm/sec. After that, the cobalt-plated pellet A was dipped into a 2 wt % lithium tetraborate aqueous solution, the resultant was taken out and dried, and thereby lithium tetraborate was provided on the surface of the anode active material particles composed of silicon to form the anode 52.

As a solvent of the electrolytic solution, ethylene carbonate (EC), diethyl carbonate (DEC), 4-fluoro-1,3-dioxolane-2-one (FEC), or 4,5-difluoro-1,3-dioxolane-2-one (DFEC) were used in combination as appropriate.

Comparative example 1-1 was a test example relative to Examples 1-1 to 1-9, and a secondary battery was fabricated in the same manner as that of Example 1-1, except that the pellet A was not dipped into the lithium tetraborate aqueous solution.

Comparative example 1-2 was a test example relative to Examples 1-5, and a secondary battery was fabricated in the same manner as that of Example 1-1, except that the pellet A was not dipped into the lithium tetraborate aqueous solution and a lithium carbonate coat being 15 nm thick was formed on the surface of the anode active material particles by using a sputtering apparatus.

Comparative example 1-3 was a test example relative to Examples 1-7 and 1-8. A secondary battery was fabricated in the same manner as that of Example 1-1, except that a pellet was dipped into a solution in which boric acid as an anion trapping agent was dissolved in hydrofluosilic acid for 3 hours, and thereby an oxide-containing film composed of silicon oxide (SiO$_2$) was precipitated. At that time, the concentrations of hydrofluosilic acid and boric acid were respectively 2 mol/dm$^3$ and 0.028 mol/dm$^3$. After that, the resultant was washed with water, dried under the reduced pressure to form the anode 52.

Comparative example 1-4 was a test example relative to Example 1-9. A secondary battery was fabricated in the same manner as that of Example 1-1, except that cobalt was fixed by electrolytic plating by using a cobalt plating solution manufactured by Japan Pure Chemical Co., Ltd., plating reaction was progressed while air was supplied to the plating solution, the current density was in the range from 2 A/dm² to 5 A/dm², and the plating rate was 10 nm/sec to form the anode 52.

Comparative example 1-5 was a test example relative to Example 1-1. A secondary battery was fabricated in the same manner as that of Example 1-1, except that the foregoing pellet B formed by using the artificial graphite as an anode active material was used, and the pellet B was not dipped into the lithium tetraborate.

Comparative example 1-6 was a test example relative to Example 1-1. A secondary battery was fabricated in the same manner as that of Example 1-1, except that the foregoing pellet B formed by using the artificial graphite as an anode active material was used.

TOF-SIMS Measurement

For the fabricated secondary batteries of Examples 1-1 to 1-9 and Comparative examples 1-1 to 1-6, analysis with the use of TOF-SIMS was performed for the anode in a state of being discharged at the second cycle as follows. As a measurement device, "TOF-SIMS V," manufactured by ION-TOF Co. was used, and measurement was performed under the following measurement conditions. The peak shown at an ion mass number of 27.97 was set to the peak of silicon.

The measurement conditions were as follows: primary ion 197 Au⁺, ion gun, accelerating voltage of 25 keV, bunching mode, irradiated ion current of 1.0 pA (measurement based on pulse beam), pulse frequency of 10 kHz, mass range of 1 amu to 800 amu, and scanning range of 200×200 μm. The mass resolution was $M/\Delta M=6800@C_2H_5^+$, $5900@CH_2^-$.

Figure 11:
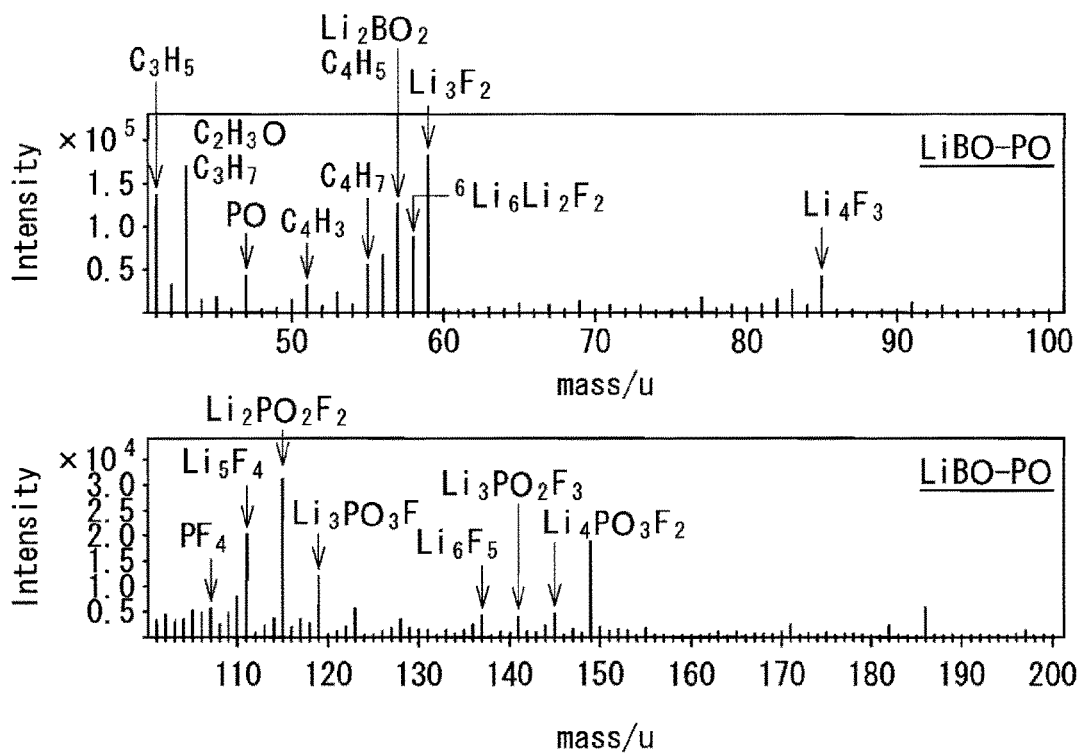
FIG. 11 is a graph showing results of TOF-SIMS positive secondary ion analysis of an anode of Example 1-1.
Figure 12:
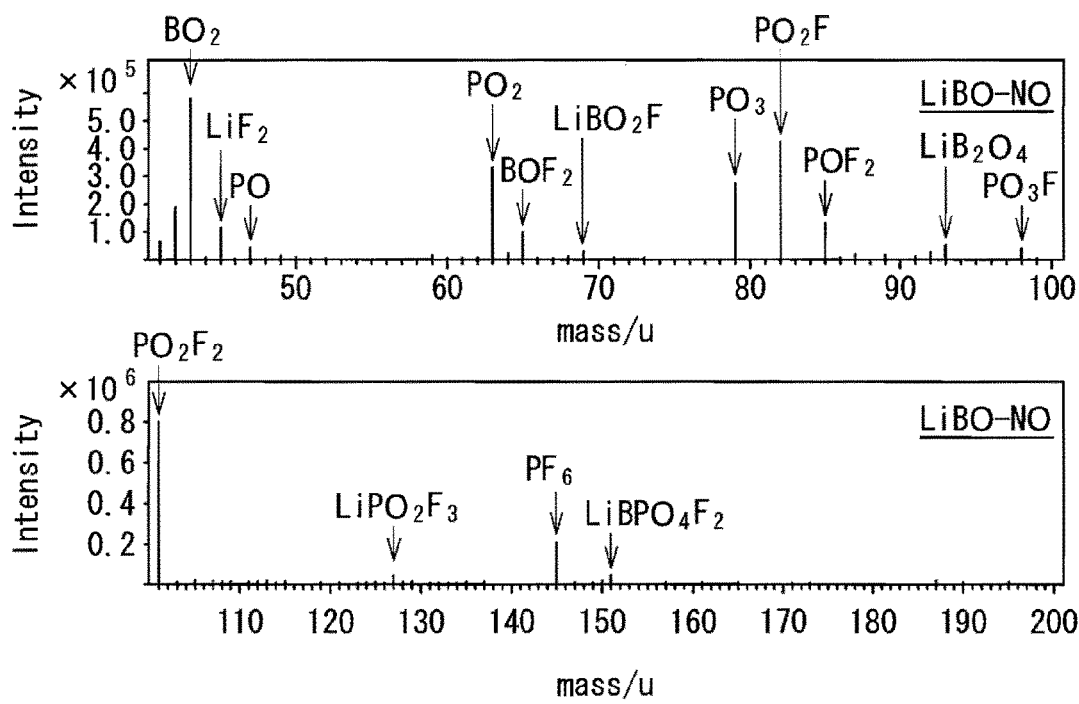
FIG. 12 is a graph showing results of TOF-SIMS negative secondary ion analysis of the anode of Example 1-1.

Results from TOF-SIMS positive secondary ion analysis and TOF-SIMS negative secondary ion analysis of the anode in the secondary battery of Example 1-1 were respectively shown in FIG. 11 and FIG. 12.

Evaluation of Cycle Characteristics

Next, the cycle characteristics of the respective secondary batteries were examined. For examining the cycle characteristics, charge and discharge were performed 100 cycles at 23 deg C., and the discharge capacity retention ratio (%) at the 100th cycle where the discharge capacity at the second cycle was 100 was obtained. The charge was performed at the constant current density of 1 mA/cm² until the battery voltage reached 4.2 V, and then charge was continuously performed at the constant voltage of 4.2 V until the current density reached 0.02 mA/cm². Discharge was performed at the constant current density of 1 mA/cm² until the battery voltage reached 2.5 V.

The results of the TOF-SIMS measurement and the evaluation of the cycle characteristics are also shown in Table 1.

TABLE 1

Battery structure: coin type

| | Anode | | Electrolytic solution solvent (wt %) | | | | TOF-SIMS peak ratio | | | Discharge capacity retention ratio |
|---|---|---|---|---|---|---|---|---|---|---|
| | Anode active material | Treatment | EC | DEC | FEC | DFEC | $Li_2PO_2F^+/Si^+$ | $Li_3PO_3F^+/Si^+$ | $Li_2BO_2^+/Si^+$ | (%) |
| Example 1-1 | Silicon (evaporation method) | $Li_2B_4O_7$ dipping | 30 | 70 | — | — | 6.88 | 5.36 | 10.9 | 80 |
| Example 1-2 | | $LiBO_2$ dipping | 30 | 70 | — | — | 6.58 | 5.29 | 8.35 | 80 |
| Example 1-3 | | $Li_2B_4O_7$ dipping | 20 | 70 | 10 | — | 7.03 | 5.89 | 9.35 | 81 |
| Example 1-4 | | $Li_2B_4O_7$ dipping | 25 | 70 | — | 5 | 7.01 | 5.77 | 9.21 | 82 |
| Example 1-5 | | $Li_2B_4O_7$ + $Li_2CO_3$ dipping | 30 | 70 | — | — | 6.97 | 5.35 | 8.20 | 82 |
| Example 1-6 | | $Li_2B_4O_7$ + LiF dipping | 30 | 70 | — | — | 7.00 | 5.13 | 9.23 | 81 |
| Example 1-7 | | $SiO_2$ coating + $Li_2B_4O_7$ dipping | 30 | 70 | — | — | 7.25 | 5.48 | 16.5 | 83 |
| Example 1-8 | | $SiO_2$ coating + $Li_2B_4O_7$ + $Li_2CO_3$ dipping | 30 | 70 | — | — | 7.31 | 5.19 | 8.23 | 85 |
| Example 1-9 | | Co plating + $Li_2B_4O_7$ dipping | 30 | 70 | — | — | 8.31 | 7.85 | 11.3 | 82 |
| Comparative example 1-1 | Silicon (evaporation method) | — | 30 | 70 | — | — | 0.27 | 0.31 | — | 23 |
| Comparative example 1-2 | | $Li_2CO_3$ sputtering | 30 | 70 | — | — | 0.39 | 0.47 | — | 35 |
| Comparative example 1-3 | | $SiO_2$ coating | 30 | 70 | — | — | 0.55 | 0.69 | — | 70 |
| Comparative example 1-4 | | Co plating | 30 | 70 | — | — | 0.25 | 0.26 | — | 68 |
| Comparative example 1-5 | Artificial graphite (Coating method) | — | 30 | 70 | — | — | — | — | — | 86 |
| Comparative example 1-6 | | $Li_2B_4O_7$ dipping | 30 | 70 | — | — | — | — | — | 77 |

As shown in Table 1, it was found that when the oxo acid salt (lithium tetraborate or lithium metaborate) was provided on the anode active material particles containing silicon, the cycle characteristics were significantly improved. Further, in all examples, a sufficient TOF-SIMS peak ratio was obtained.

Further, from the results of Examples 1-3 and 1-4, it was found that when the fluorinated carbonate was used as an electrolytic solution solvent, the cycle characteristics were further improved. From the results of Examples 1-5 and 1-6, it was found that when the oxo acid salt and the lithium salt were combined, the cycle characteristics were further improved. Moreover, from the results of Examples 1-7 and 1-8, it was found that when the oxide-containing film that contains the silicon oxide was provided on the surface of the anode active material particles, and the oxo acid salt was further provided, the cycle characteristics were further improved. From the results of Example 1-9, it was found that when cobalt plating was provided, and the oxo acid salt was further provided, the cycle characteristics were further improved.

Meanwhile, it was found that in the case that the artificial graphite was used as an anode active material, even when the oxo acid salt was provided on the surface of the anode active material particles, the cycle characteristics were not able to be improved.

Examples 2-1 to 2-12

Secondary batteries were fabricated in the same manner as that of Example 1-1 and the like, except that the anode 52 was formed as follows.

In Examples 2-1, 2-3, 2-4, 2-10, 2-11, and 2-12, the foregoing pellet A formed by using silicon as an anode active material was dipped into a 3 wt % lithium orthosilicate aqueous solution for several seconds, the resultant was taken out and dried, and thereby lithium orthosilicate was provided on the surface of the anode active material particles composed of silicon to form the anode 52.

In Example 2-2, the pellet A was dipped into a 3 wt % lithium metasilicate aqueous solution for several seconds, the resultant was taken out and dried, and thereby lithium metasilicate was provided on the surface of the anode active material particles composed of silicon to form the anode 52.

In Examples 2-5, 2-6, and 2-7, the pellet A was dipped into a solution in which boric acid as an anion trapping agent was dissolved in hydrofluosilic acid for 3 hours, and thereby an oxide-containing film composed of silicon oxide ($SiO_2$) was precipitated. The concentrations of hydrofluosilic acid and boric acid were respectively 2 mol/dm$^3$ and 0.028 mol/dm$^3$. After that, the resultant was washed with water, and dried under the reduced pressure. The resultant was dipped into a 2 wt % lithium orthosilicate aqueous solution, taken out and dried, and thereby lithium orthosilicate was provided on the surface of the anode active material particles composed of silicon to form the anode 52.

In Example 2-8, cobalt was fixed on the surface of the pellet A by electrolytic plating. At that time, a cobalt plating solution manufactured by Japan Pure Chemical Co., Ltd. was used. While air was supplied to the plating solution, plating reaction was progressed. The current density was in the range from 2 A/dm$^2$ to 5 A/dm$^2$, and the plating rate was 10 nm/sec. After that, the cobalt-plated pellet A was dipped into a 2 wt % lithium orthosilicate aqueous solution, the resultant was taken out and dried, and thereby lithium orthosilicate was provided on the surface of the anode active material particles composed of silicon to form the anode 52.

In Example 2-9, as in Examples 2-5 to 2-7, an oxide-containing film composed of silicon oxide ($SiO_2$) was precipitated on the pellet A. After that, as in Example 2-8, cobalt was fixed on the surface thereof by electrolytic plating. After that, the cobalt-plated pellet A was dipped into a 2 wt % lithium orthosilicate aqueous solution, the resultant was taken out and dried, and thereby lithium orthosilicate was provided on the surface of the anode active material particles composed of silicon to form the anode 52.

As an additive of the electrolytic solution, lithium tetrafluoroborate ($LiBF_4$: 0.1 mol/kg), propene sultone (PRS: 1 wt %), or sulfobenzoic acid anhydride (SBAH: 1 wt %) was used.

Comparative example 2-1 was a test example relative to Examples 2-1 to 2-12, and a secondary battery was fabricated in the same manner as that of Example 2-1, except that the pellet A was not dipped into the lithium orthosilicate solution, and 0.5 wt % of lithium orthosilicate was added to the electrolytic solution and the resultant mixture was sufficiently agitated to be saturated.

Comparative example 2-2 was a test example relative to Example 2-1, and a secondary battery was fabricated in the same manner as that of Example 2-1, except that the pellet A was not dipped into the lithium orthosilicate solution, and a lithium orthosilicate coat being 25 nm thick was formed on the surface of the anode active material particles by using a sputtering apparatus.

Comparative example 2-3 was a test example relative to Example 2-8, and a secondary battery was fabricated in the same manner as that of Example 2-8, except that the pellet A was not dipped into the lithium orthosilicate solution.

Comparative example 2-4 was a test example relative to Example 2-9, and a secondary battery was fabricated in the same manner as that of Example 2-9, except that the pellet A was not dipped into the lithium orthosilicate solution.

For the secondary batteries of Examples 2-1 to 2-12 and Comparative examples 2-1 to 2-4, TOF-SIMS and the cycle characteristics were examined in the same manner as that of Example 1-1 and the like. The results thereof are shown in Table 2.

TABLE 2

| | Battery structure: coin type | | | | | | | | | |
|---|---|---|---|---|---|---|---|---|---|---|
| | Anode | | Electrolytic solution | | | | | TOF-SIMS peak ratio | | Discharge capacity retention ratio |
| | Anode active material | Treatment | Solvent (wt %) | | | | | | | |
| | | | EC | DEC | FEC | DFEC | Others | $Li_2PO_2F_2+/Si+$ | $Li_3PO_3F+/Si+$ | $Li_2BO_2+/Si+$ | (%) |
| Example 2-1 | Silicon (evaporation method) | $Li_4SiO_4$ dipping | 30 | 70 | — | — | — | 7.23 | 5.31 | — | 75 |
| Example 2-2 | | $Li_2SiO_3$ dipping | 30 | 70 | — | — | — | 7.11 | 5.23 | — | 45 |
| Example 2-3 | | $Li_4SiO_4$ dipping | 20 | 70 | 10 | — | — | 7.10 | 5.90 | — | 83 |
| Example 2-4 | | $Li_4SiO_4$ dipping | 25 | 70 | — | 5 | — | 7.15 | 5.88 | — | 84 |
| Example 2-5 | | $SiO_2$ coating + $Li_4SiO_4$ dipping | 30 | 70 | — | — | — | 7.27 | 5.49 | — | 82 |
| Example 2-6 | | $SiO_2$ coating + $Li_4SiO_4$ dipping | — | 70 | 30 | — | — | 7.35 | 5.32 | — | 88 |

TABLE 2-continued

Battery structure: coin type

| | Anode | | Electrolytic solution | | | | | TOF-SIMS peak ratio | | | Discharge capacity retention ratio |
|---|---|---|---|---|---|---|---|---|---|---|---|
| | Anode active | | Solvent (wt %) | | | | | | | | |
| | material | Treatment | EC | DEC | FEC | DFEC | Others | $Li_2PO_2F_2+/Si+$ | $Li_3PO_3F+/Si+$ | $Li_2BO_2+/Si+$ | (%) |
| Example 2-7 | | $SiO_2$ coating + $Li_4SiO_4$ dipping | — | 70 | 20 | 10 | — | 7.40 | 5.20 | — | 90 |
| Example 2-8 | | Co plating + $Li_4SiO_4$ dipping | 30 | 70 | — | — | — | 7.30 | 5.61 | — | 80 |
| Example 2-9 | | $SiO_2$ coating + Co plating + $Li_4SiO_4$ dipping | — | 70 | 20 | 10 | — | 7.20 | 5.31 | — | 92 |
| Example 2-10 | | $Li_4SiO_4$ dipping | 30 | 70 | — | — | $LiBF_4$ | 7.25 | 5.35 | 260.6 | 76 |
| Example 2-11 | | $Li_4SiO_4$ dipping | 30 | 70 | — | — | PRS | 7.15 | 5.88 | — | 76 |
| Example 2-12 | | $Li_4SiO_4$ dipping | 30 | 70 | — | — | SBAH | 7.25 | 5.55 | — | 77 |
| Comparative example 2-1 | Silicon (evaporation method) | — | 30 | 70 | — | — | $Li_4SiO_4$ | 0.30 | 0.42 | — | 25 |
| Comparative example 2-2 | | $Li_4SiO_4$ sputtering | 30 | 70 | — | — | — | 7.15 | 5.10 | — | 53 |
| Comparative example 2-3 | | Co plating | 30 | 70 | — | — | — | 0.52 | 0.78 | — | 76 |
| Comparative example 2-4 | | $SiO_2$ coating + Co plating | — | 70 | 20 | 10 | — | 7.03 | 5.10 | — | 87 |

As shown in Table 2, it was found that when the oxo acid salt (lithium orthosilicate or lithium metasilicate) was provided on the anode active material particles containing silicon, the cycle characteristics were significantly improved. Further, in all examples, a sufficient TOF-SIMS peak ratio was obtained.

Further, from the results of Examples 2-3 to 2-7, it was found that when the fluorinated carbonate was used as an electrolytic solution solvent, the cycle characteristics were further improved. From the results of Examples 2-5 to 2-7, it was found that when the oxide-containing film that contains the silicon oxide was provided on the surface of the anode active material particles, and the oxo acid salt was further provided, the cycle characteristics were further improved. Further, from the results of Example 2-8, it was found that when cobalt plating was provided, and the oxo acid salt was further provided, the cycle characteristics were further improved. From the results of Example 2-9, it was found that when the oxide-containing film that contains the silicon oxide was provided on the surface of the anode active material particles, cobalt plating was provided in the anode active material layer, and the oxo acid salt was further provided, the cycle characteristics were significantly improved. From the results of Examples 2-10 to 2-12, it was found that when $LiBF_4$, sultone (PRS), or acid anhydride (SBAH) was added into the electrolytic solution, the cycle characteristics were significantly improved.

Examples 3-1 and 3-2

First, 90 wt % of silicon powder having an average particle diameter of 1 μm as an anode active material and 10 wt % of polyvinylidene fluoride as a binder were mixed, the resultant mixture was dispersed in N-methyl-2-pyrrolidone as a solvent to obtain anode mixture slurry. Subsequently, the anode current collector 52A made of a copper foil being 18 μm thick was uniformly coated with the anode mixture slurry, and the resultant was dried and pressurized. After that, the resultant was heated in the vacuum atmosphere at 400 deg C. for 12 hours to form the anode active material layer 52B, which was punched out into a pellet being 16 mm in diameter. The pellet was dipped into a lithium tetraborate aqueous solution as in Example 1-1 to form the anode 52.

A secondary battery of Example 3-1 was fabricated in the same manner as that of Example 1-1, except that the foregoing anode 52 was used.

In Example 3-2, a secondary battery was fabricated in the same manner as that of Example 3-1, except that a pellet was dipped into a lithium orthosilicate aqueous solution to form the anode 52, and that anode 52 was used.

As Comparative example 3-1 relative to Examples 3-1 and 3-2, a secondary battery was fabricated in the same manner as that of Example 3-1, except that a pellet was not dipped into lithium tetraborate or lithium orthosilicate.

For the fabricated secondary batteries of Examples 3-1, 3-2, and Comparative example 3-1, TOF-SIMS and the cycle characteristics were examined in the same manner as that of Example 1-1. The results thereof are shown in Table 3.

TABLE 3

Battery structure: coin type

| | Anode | | Electrolytic solution | | TOF-SIMS peak ratio | | | Discharge capacity retention ratio |
|---|---|---|---|---|---|---|---|---|
| | Anode active material | Treatment | solvent (wt %) EC | DEC | $Li_2PO_2F_2+/Si+$ | $Li_3PO_3F+/Si+$ | $Li_2BO_2+/Si+$ | (%) |
| Example 3-1 | Silicon (sintering method) | $Li_2B_4O_7$ dipping | 30 | 70 | 6.88 | 4.38 | 11.3 | 32 |
| Example 3-2 | Silicon (sintering method) | $Li_4SiO_4$ dipping | 30 | 70 | 7.15 | 4.88 | — | 35 |
| Comparative example 3-1 | Silicon (sintering method) | — | 30 | 70 | 0.27 | 0.32 | — | 30 |

As shown in Table 3, it was found that when the oxo acid salt (lithium tetraborate or lithium orthosilicate) was provided on the surface of the anode active material particles containing silicon, the cycle characteristics were improved. Further, based on comparison with Examples 1-1 and 2-1, it was found that the cycle characteristics were further improved when the anode active material layer was formed by vapor-phase deposition method.

Examples 4-1 and 4-2

80 parts by weight of a SnCoC-containing material as an anode active material, 11 parts by weight of graphite and 1 part by weight of acetylene black as an electrical conductor, and 8 parts by weight of polyvinylidene fluoride as a binder were mixed, the resultant mixture was dispersed in N-methyl-2-pyrrolidone as a solvent to obtain anode mixture slurry. Subsequently, the anode current collector 52A made of a copper foil being 10 μm thick was uniformly coated with the anode mixture slurry, and the resultant was dried. After that, the resultant was compression-molded to form the anode active material layer 52B, which was punched out into a pellet being 16 mm in diameter.

Figure 10:
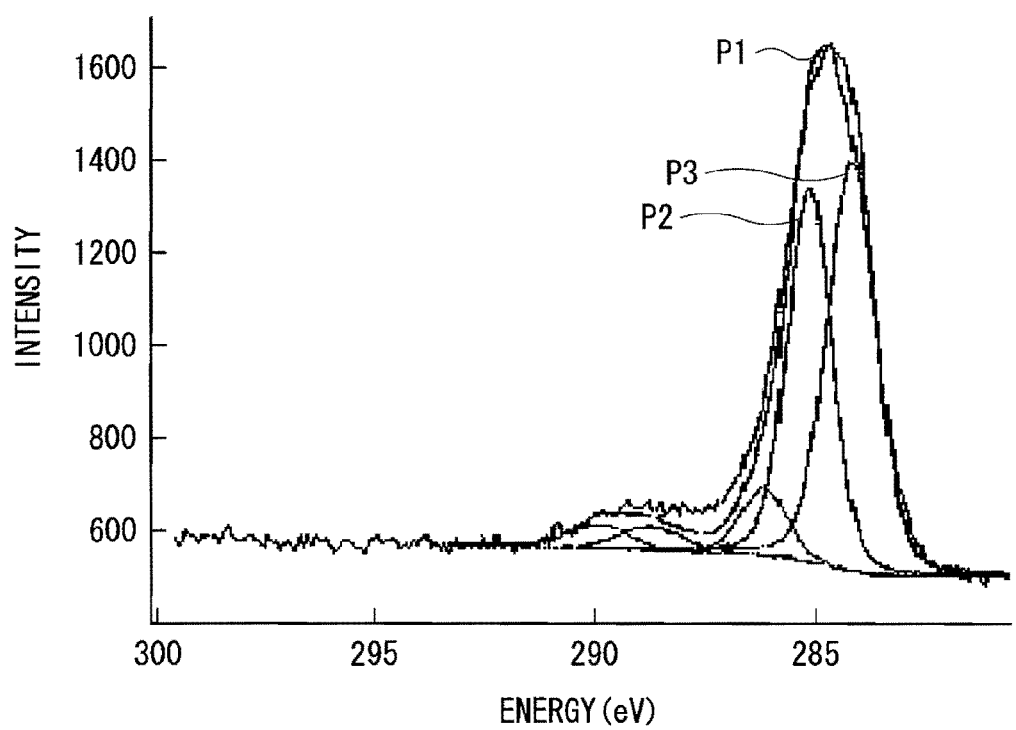
FIG. 10 is an example of peaks obtained by X-ray Photoelectron Spectroscopy according to a SnCoC-containing material formed in the examples.

The SnCoC-containing material was synthesized by mixing tin-cobalt-indium alloy powder and carbon powder and using mechanochemical reaction. For the obtained SnCoC-containing material, the composition of the SnCoC-containing material was analyzed. The tin content was 48 wt %, the cobalt content was 23 wt %, the carbon content was 20 wt %, and the cobalt ratio to the total of tin and cobalt (Co/(Sn+Co)) was 32.4 wt %. The carbon content was measured by a carbon sulfur analyzer. The tin content and the cobalt content were measured by Inductively Coupled Plasma (ICP) optical emission spectroscopy. Further, the obtained SnCoC-containing material was provided with X-ray diffraction. As a result, the diffraction peak having a wide half bandwidth in which diffraction angle 2θ was 1.0 deg or more was observed in the range of the diffraction angle 2θ=20 to 50 degrees. Furthermore, when the SnCoC-containing material was provided with XPS, Peak P1 was obtained as shown in FIG. 10. When Peak P1 was analyzed, Peak P2 of the surface contamination carbon and Peak P3 of C1s in the SnCoC-containing material on the energy side lower than that of Peak P2 were obtained. The Peak P3 was obtained in the region lower than 284.5 eV. That is, it was confirmed that carbon in the SnCoC-containing material was bonded to other element.

The pellet was dipped into lithium tetraborate as in Example 1-1 to form the anode 52. A secondary battery of Example 4-1 was fabricated in the same manner as that of Example 1-1, except that the foregoing anode 52 was used.

In Example 4-2, a secondary battery was fabricated in the same manner as that of Example 4-1, except that a pellet was dipped into a lithium orthosilicate aqueous solution to form the anode 52, and that anode 52 was used.

As Comparative example 4-1 relative to Examples 4-1 and 4-2, a secondary battery was fabricated in the same manner as that of Example 4-1, except that a pellet was not dipped into lithium tetraborate or lithium orthosilicate.

For the secondary batteries of Examples 4-1, 4-2, and Comparative example 4-1, TOF-SIMS and the cycle characteristics were examined in the same manner as that of Example 1-1. The results thereof are shown in Table 4.

TABLE 4

Battery structure: coin type

| | Anode | | Electrolytic solution | | TOF-SIMS peak ratio | | | Discharge capacity retention ratio |
|---|---|---|---|---|---|---|---|---|
| | Anode active material | Treatment | solvent (wt %) EC | DEC | $Li_2PO_2F_2+/Si+$ | $Li_3PO_3F+/Si+$ | $Li_2BO_2+/Si+$ | (%) |
| Example 4-1 | SnCoC (coating method) | $Li_2B_4O_7$ dipping | 30 | 70 | 4.35 | 3.67 | 3.05 | 55 |
| Example 4-2 | SnCoC (coating method) | $Li_4SiO_4$ dipping | 30 | 70 | 4.22 | 3.55 | — | 54 |
| Comparative example 4-1 | SnCoC (coating method) | — | 30 | 70 | 0.95 | 1.17 | — | 50 |

As shown in Table 4, it was found that when the oxo acid salt (lithium tetraborate or lithium orthosilicate) was provided on the surface of the anode active material particles containing tin, the cycle characteristics were improved.

Examples 5-1 and 5-2

Secondary batteries of Examples 5-1 and 5-2 were fabricated in the same manner as that of Examples 1-7 and 2-5, except that the cylindrical secondary battery shown in FIG. 1 and FIG. 2 was used. The anode 22 was obtained as follows. Silicon was evaporated on the anode current collector 22A by electron beam evaporation method to form the anode active material layer 22B. After that, in the same manner as that of Example 1-7, an oxide-containing film made of silicon oxide was formed, and the resultant was dipped into lithium tetraborate or lithium orthosilicate. For the separator 23, a microporous polypropylene film being 25 μm thick was used.

As Comparative example 5-1 relative to Examples 5-1 and 5-2, a secondary battery was fabricated in the same manner as that of Examples 5-1 and 5-2, except that a pellet was not dipped into lithium tetraborate or lithium orthosilicate.

For the fabricated secondary batteries of Examples 5-1, 5-2, and Comparative example 5-1, TOF-SIMS and the cycle characteristics were examined in the same manner as that of Examples 1-7 and 2-5. The results thereof are shown in Table 5.

Next, the cathode lead 31 made of aluminum was attached to the cathode 33 and the anode lead 32 made of nickel was attached to the anode 34. The cathode 33 and the anode 34 were layered with the separator 35 in between to obtain a laminated body. After that, the laminated body was spirally wound, the resultant was enclosed into the package member 40 made of a laminated film under the reduced pressure. Thereby, the secondary battery was fabricated.

Comparative example 6-1 was a test example relative to Examples 6-1 to 6-9, and a secondary battery was fabricated in the same manner as that of Example 6-1, except that dipping treatment with the use of lithium tetraborate was not provided when the anode 34 was formed.

Comparative example 6-2 was a test example relative to Example 6-5, and a secondary battery was fabricated in the same manner as that of Example 6-1, except that dipping treatment with the use of lithium tetraborate was not provided when the anode 34 was formed, and a lithium carbonate coat being 15 nm thick was formed on the surface of the anode active material particles by using a sputtering apparatus.

Comparative example 6-3 was a test example relative to Examples 6-7 and 6-8, and a secondary battery was fabricated in the same manner as that of Example 6-1, except for the following procedure. A pellet was dipped into a solution in which boric acid as an anion trapping agent was dissolved in hydrofluosilic acid for 3 hours, and thereby an oxide-containing film composed of silicon oxide ($SiO_2$) was pre-

TABLE 5

| | Battery structure: cylindrical | | | | | | | |
|---|---|---|---|---|---|---|---|---|
| | Anode | | Electrolytic solution | | | | | Discharge capacity |
| | Anode active material | Treatment | solvent (wt %) | | TOF-SIMS peak ratio | | | retention ratio |
| | | | EC | DEC | $Li_2PO_2F_2+/Si+$ | $Li_3PO_3F+/Si+$ | $Li_2BO_2+/Si+$ | (%) |
| Example 5-1 | Silicon (evaporation method) | $SiO_2$ coating + $Li_2B_4O_7$ dipping | 30 | 70 | 6.45 | 4.77 | 8.65 | 72 |
| Example 5-2 | | $SiO_2$ coating + $Li_4SiO_4$ dipping | 30 | 70 | 6.60 | 4.80 | — | 65 |
| Comparative example 5-1 | Silicon (evaporation method) | $SiO_2$ coating | 30 | 70 | 0.34 | 0.41 | — | 20 |

As shown in Table 5, it was found that when the anode active material particles containing silicon was covered with the silicon oxide, and lithium tetraborate or lithium orthosilicate was provided, the cycle characteristics were significantly improved.

Examples 6-1 to 6-9

Secondary batteries of Examples 6-1 to 6-9 were fabricated in substantially the same manner as that of Examples 1-1 to 1-9, except that the laminated film secondary battery shown in FIG. 7 and FIG. 8 was used. The anode 34 was formed as follows. Silicon was evaporated on the anode current collector 34A by electron beam evaporation method to form the anode active material layer 34B. After that, respective treatments were provided as in Examples 1-1 to 1-9.

For the separator, a microporous polypropylene film being 25 μm thick was used.

cipitated. The concentrations of hydrofluosilic acid and boric acid were respectively 2 $mol/dm^3$ and 0.028 $mol/dm^3$. After that, the resultant was washed with water, dried under the reduced pressure to form the anode 34.

Comparative example 6-4 was a test example relative to Example 6-9, and cobalt was fixed by electrolytic plating. A secondary battery was fabricated in the same manner as that of Example 6-1, except for the following procedure. A cobalt plating solution manufactured by Japan Pure Chemical Co., Ltd. was used. While air was supplied to the plating solution, plating reaction was progressed. The current density was in the range from 2 $A/dm^2$ to 5 $A/dm^2$, and the plating rate was 10 nm/sec to form the anode 34.

Comparative example 6-5 was a test example relative to Example 6-1, and a secondary battery was fabricated in the same manner as that of Example 6-1, except that when the anode was formed, an artificial graphite was used as an anode active material, and dipping treatment with the use of lithium tetraborate was not provided.

Comparative example 6-6 was a test example relative to Example 6-1, and a secondary battery was fabricated in the same manner as that of Example 6-1, except that when the anode was formed, an artificial graphite was used as an anode active material.

For the fabricated secondary batteries of Examples 6-1 to 6-9 and Comparative examples 6-1 to 6-6, TOF-SIMS and the cycle characteristics were examined in the same manner as that of Example 1-1. The results thereof are shown in Table 6.

contained the silicon oxide was provided on the surface of the anode active material particles, and the poly acid salt was further provided, the cycle characteristics were further improved. From the results of Example 6-9, it was found that when cobalt plating was provided and the oxo acid salt was provided, the cycle characteristics were further improved.

Examples 7-1 to 7-12

Secondary batteries of Examples 7-1 to 7-12 were fabricated in substantially the same manner as that of Examples

TABLE 6

Battery structure: laminated film

| | Anode | | Electrolytic solution | | | | TOF-SIMS | | | Discharge capacity retention ratio |
|---|---|---|---|---|---|---|---|---|---|---|
| | Anode active | | solvent (wt %) | | | | peak ratio | | | |
| | material | Treatment | EC | DEC | FEC | DFEC | $Li_2PO_2F_2+/Si+$ | $Li_3PO_3F+/Si+$ | $Li_2BO_2+/Si+$ | (%) |
| Example 6-1 | Silicon | $Li_2B_4O_7$ dipping | 30 | 70 | — | — | 6.55 | 5.13 | 11.5 | 77 |
| Example 6-2 | (evaporation | $LiBO_2$ dipping | 30 | 70 | — | — | 6.29 | 5.21 | 8.20 | 76 |
| Example 6-3 | method) | $Li_2B_4O_7$ dipping | 20 | 70 | 10 | — | 6.59 | 5.44 | 9.50 | 77 |
| Example 6-4 | | $Li_2B_4O_7$ dipping | 25 | 70 | — | 5 | 6.99 | 4.89 | 9.30 | 78 |
| Example 6-5 | | $Li_2B_4O_7$ + $Li_2CO_3$ dipping | 30 | 70 | — | — | 6.13 | 5.14 | 8.40 | 79 |
| Example 6-6 | | $Li_2B_4O_7$ + LiF dipping | 30 | 70 | — | — | 5.93 | 5.55 | 9.55 | 77 |
| Example 6-7 | | $SiO_2$ coating + $Li_2B_4O_7$ dipping | 30 | 70 | — | — | 6.19 | 5.42 | 18.0 | 79 |
| Example 6-8 | | $SiO_2$ coating + $Li_2B_4O_7$ + $Li_2CO_3$ dipping | 30 | 70 | — | — | 6.87 | 5.39 | 8.30 | 79 |
| Example 6-9 | | Co plating + $Li_2B_4O_7$ dipping | 30 | 70 | — | — | 8.58 | 8.00 | 11.6 | 78 |
| Comparative example 6-1 | Silicon (evaporation | — | 30 | 70 | — | — | 0.29 | 0.33 | — | 23 |
| Comparative example 6-2 | method) | $Li_2CO_3$ sputtering | 30 | 70 | — | — | 0.35 | 0.43 | — | 35 |
| Comparative example 6-3 | | $SiO_2$ coating | 30 | 70 | — | — | 0.57 | 0.61 | — | 70 |
| Comparative example 6-4 | | Co plating | 30 | 70 | — | — | 0.32 | 0.26 | — | 63 |
| Comparative example 6-5 | Artificial graphite | — | 30 | 70 | — | — | — | — | — | 93 |
| Comparative example 6-6 | (Coating method) | $Li_2B_4O_7$ dipping | 30 | 70 | — | — | — | — | — | 85 |

As shown in Table 6, it was found that when the oxo acid salt (lithium tetraborate or lithium metaborate) was provided on the anode active material particles containing silicon, the cycle characteristics were significantly improved. Further, in all examples, a sufficient TOF-SIMS peak ratio was obtained.

Further, from the results of Examples 6-3 and 6-4, it was found that when the fluorinated carbonate was used as an electrolytic solution solvent, the cycle characteristics were further improved. From the results of Examples 6-5 and 6-6, it was found that when the poly acid salt and the lithium salt were combined, the cycle characteristics were further improved. Further, from the results of Examples 6-7 and 6-8, it was found that when the oxide-containing film that 2-1 to 2-12, except that the laminated film secondary battery was used as in Examples 6-1 to 6-9.

Secondary batteries of Comparative examples 7-1 to 7-4 were fabricated in substantially the same manner as that of Comparative examples 2-1 to 2-4, except that the laminated film secondary battery was used as in Examples 6-1 to 6-9.

For the fabricated secondary batteries of Examples 7-1 to 7-12 and Comparative examples 7-1 to 7-4, TOF-SIMS and the cycle characteristics were examined in the same manner as that of Example 1-1 and the like. The results thereof are shown in Table 7.

TABLE 7

Battery structure: laminated film

| | Anode | | Electrolytic solution | | | | | TOF-SIMS peak ratio | | | Discharge capacity retention ratio (%) |
|---|---|---|---|---|---|---|---|---|---|---|---|
| | Anode active material | Treatment | Solvent (wt %) | | | | | | | | |
| | | | EC | DEC | FEC | DFEC | Others | $Li_2PO_2F_2+/Si+$ | $Li_3PO_3F+/Si+$ | $Li_2BO_2+/Si+$ | |
| Example 7-1 | Silicon (evaporation method) | $Li_4SiO_4$ dipping | 30 | 70 | — | — | — | 7.23 | 5.31 | — | 72 |
| Example 7-2 | | $Li_2SiO_3$ dipping | 30 | 70 | — | — | — | 7.11 | 5.23 | — | 38 |
| Example 7-3 | | $Li_4SiO_4$ dipping | 20 | 70 | 10 | — | — | 7.10 | 5.90 | — | 73 |
| Example 7-4 | | $Li_4SiO_4$ dipping | 25 | 70 | — | 5 | — | 7.15 | 5.88 | — | 74 |
| Example 7-5 | | $SiO_2$ coating + $Li_4SiO_4$ dipping | 30 | 70 | — | — | — | 7.27 | 5.49 | — | 75 |
| Example 7-6 | | $SiO_2$ coating + $Li_4SiO_4$ dipping | — | 70 | 30 | — | — | 7.35 | 5.32 | — | 83 |
| Example 7-7 | | $SiO_2$ coating + $Li_4SiO_4$ dipping | — | 70 | 20 | 10 | — | 7.40 | 5.20 | — | 83 |
| Example 7-8 | | Co plating + $Li_4SiO_4$ dipping | 30 | 70 | — | — | — | 7.53 | 5.82 | — | 80 |
| Example 7-9 | | $SiO_2$ coating + Co plating + $Li_4SiO_4$ dipping | — | 70 | 20 | 10 | — | 7.20 | 5.31 | — | 90 |
| Example 7-10 | | $Li_4SiO_4$ dipping | 30 | 70 | — | — | $LiBF_4$ | 7.25 | 5.35 | 203.6 | 73 |
| Example 7-11 | | $Li_4SiO_4$ dipping | 30 | 70 | — | — | PRS | 7.15 | 5.88 | — | 73 |
| Example 7-12 | | $Li_4SiO_4$ dipping | 30 | 70 | — | — | SBAH | 7.25 | 5.55 | — | 74 |
| Comparative example 7-1 | Silicon (evaporation method) | — | 30 | 70 | — | — | $Li_4SiO_4$ | 0.30 | 0.42 | — | 25 |
| Comparative example 7-2 | | $Li_4SiO_4$ sputtering | 30 | 70 | — | — | — | 7.15 | 5.10 | — | 50 |
| Comparative example 7-3 | | Co plating | 30 | 70 | — | — | — | 0.35 | 0.67 | — | 75 |
| Comparative example 7-4 | | $SiO_2$ coating + Co plating | — | 70 | 20 | 10 | — | 7.03 | 5.00 | — | 82 |

As shown in Table 7, it was found that when the oxo acid salt (lithium orthosilicate or lithium metasilicate) was provided on the anode active material particles containing silicon, the cycle characteristics were significantly improved. Further, in all examples, a sufficient TOF-SIMS peak ratio was obtained.

Further, from the results of Examples 7-3 to 7-7, it was found that when the fluorinated carbonate was used as an electrolytic solution solvent, the cycle characteristics were further improved. From the results of Examples 7-5 to 7-7, it was found that when the oxide-containing film that contains the silicon oxide was provided on the surface of the anode active material particles, and the oxo acid salt was further provided, the cycle characteristics were further improved. Further, from the results of Example 7-8, it was found that when cobalt plating was provided, and the oxo acid salt was further provided, the cycle characteristics were further improved. From the results of Example 7-9, it was found that when the oxide-containing film that contains the silicon oxide was provided on the surface of the anode active material particles, cobalt plating was provided in the anode active material layer, and the oxo acid salt was further provided, the cycle characteristics were significantly improved. From the results of Examples 7-10 to 7-12, it was found that when $LiBF_4$, sultone (PRS), or acid anhydride (SBAH) was added into the electrolytic solution, the cycle characteristics were further improved.

Forming a Coat with the Use of Borate-Containing Electrolytic Solution

Examples 8-1 to 8-10

Coin type secondary batteries shown in FIG. 9 were fabricated. In the secondary battery, the cathode 51 and the anode 52 were layered with the separator 53 impregnated with an electrolytic solution in between, and the laminated body was sandwiched between the package can 54 and the package cup 55 and was caulked with the gasket 56.

First, lithium carbonate ($Li_2CO_3$) and cobalt carbonate ($CoCO_3$) were mixed at a molar ratio of $Li_2CO_3$: $CoCO_3$=0.5:1. After that, the mixture was fired in the air at 900 deg C. for 5 hours. Thereby, lithium cobalt complex oxide ($LiCoO_2$) was obtained as a cathode active material. Next, 91 parts by weight of the lithium cobalt complex oxide, 6 parts by weight of graphite as an electrical conductor, and 3 parts by weight of polyvinylidene fluoride as a binder were mixed to prepare a cathode mixture. After that, the cathode mixture was dispersed in N-methyl-2-pyrrolidone as a solvent to obtain cathode mixture slurry. Subsequently, the cathode current collector 51A made of an aluminum foil being 20 μm thick was uniformly coated with the cathode mixture slurry, which was dried. After that, the resultant was compression-molded to form the cathode active material layer 51B. After that, the resultant was punched out into a pellet being 15.5 mm in diameter to form the cathode 51.

Further, an anode active material layer 52B was formed on the anode current collector 52A made of a copper foil being 10 μm thick by evaporating silicon by electron beam evaporation method. After that, the resultant was punched out into a pellet being 16 mm in diameter to form the anode 52.

Next, the formed cathode 51 and the formed anode 52 were laid over the package can 54 with the separator 53 made of a microporous polypropylene film in between. An electrolytic solution was injected thereon, the package cup 55 was laid thereon, and the resultant was caulked and thereby hermetically sealed. Accordingly, the secondary batteries of Examples 8-1 to 8-10 were fabricated. For the electrolytic solution, as a solvent, an electrolyte, and a poly acid salt, the compounds shown in Table 8 were used.

As an electrolyte salt, in addition to lithium hexafluorophosphate ($LiPF_6$), lithium bisoxalate borate (LiBOB) or lithium bis(pentafluoroethane sulfonyl)imide (LiBETI) was used. In Example 8-10, the concentration of lithium tetrafluoroborate was 0.05 mol/kg.

As Comparative example 8-1, a secondary battery was fabricated in the same manner as that of Example 8-1, except that lithium tetrafluoroborate was not added. As Comparative example 8-2 relative to Example 8-4, a secondary battery was fabricated in the same manner as that of Example 8-4, except that the same electrolytic solution solvent was used but lithium tetrafluoroborate was not added. As Comparative example 8-3 relative to Example 8-10, a secondary battery was fabricated in the same manner as that of Example 8-10, except that the same electrolytic solution solvent was used but lithium tetrafluoroborate was not added.

Figure 13:
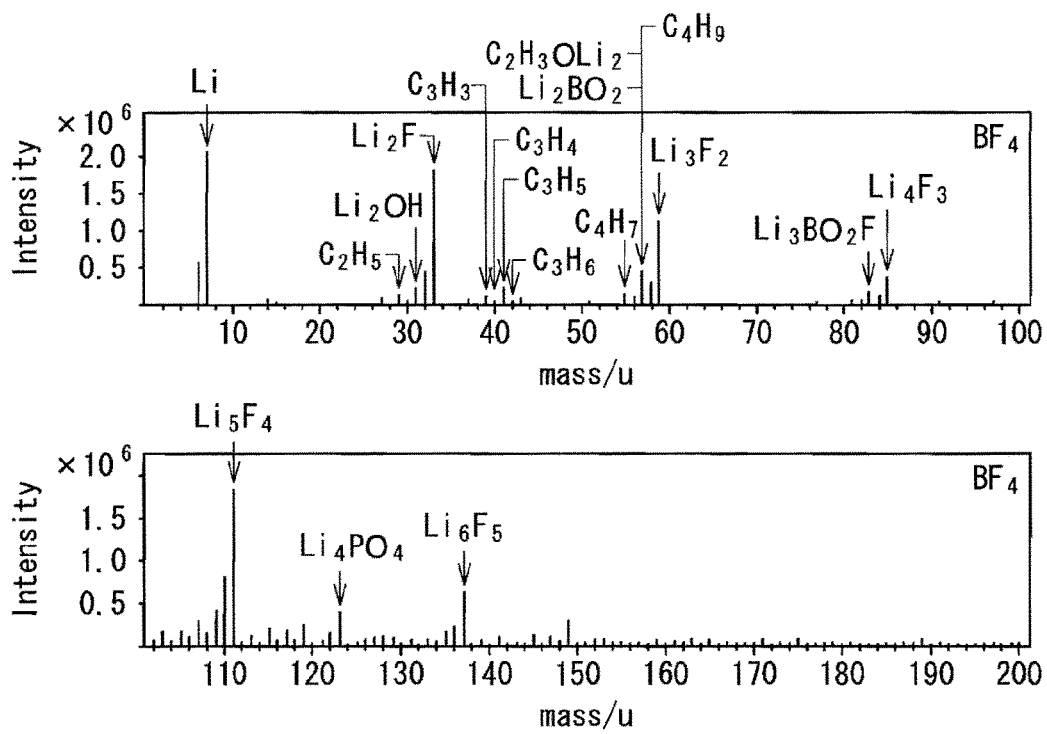
FIG. 13 is a graph showing results of TOF-SIMS positive secondary ion analysis of an anode of Example 8-10.
Figure 14:
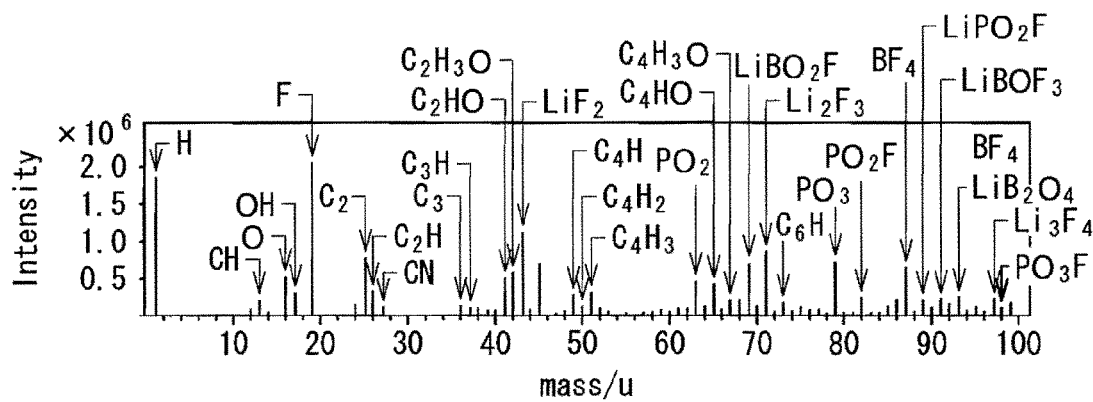
FIG. 14 is a graph showing results of TOF-SIMS negative secondary ion analysis of the anode of Example 8-10.
Figure 14:
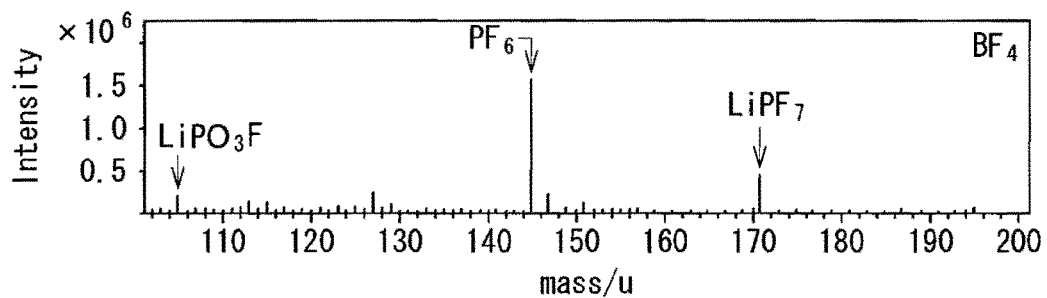

For the fabricated secondary batteries of Examples 8-1 to 8-10 and Comparative examples 8-1 to 8-3, TOF-SIMS and the cycle characteristics were examined in the same manner as that of Example 1-1. The results thereof are shown in Table 8. Further, results from TOF-SIMS positive secondary ion analysis and TOF-SIMS negative secondary ion analysis of the anode in the secondary battery of Example 8-10 are respectively shown in FIG. 13 and FIG. 14.

As shown in Table 8, it was found that when the anode active material was silicon and the oxo acid salt (lithium tetraborate, lithium metaborate, or lithium tetrafluoroborate) was added to the electrolytic solution, the cycle characteristics were significantly improved. When the additive amount of lithium borate was smaller, the cycle characteristics were favorable. Further, in all examples, a sufficient TOF-SIMS peak ratio was obtained.

Further, from the results of Examples 8-1 to 8-3, it was found that when the content of the borate in the electrolytic solution was in the range from 0.5 wt % to 5 wt %, superior cycle characteristics were obtained. In this case, when the content of the borate was 0.01 wt % or more, superior cycle characteristics were obtained as well. Further, from the results of Examples 8-4 to 8-6, it was found that the cycle characteristics were further improved by using the fluorinated carbonate as an electrolytic solution solvent. From the results of Examples 8-8 and 8-9, it was found that the cycle characteristics were further improved by using lithium bisoxalate borate or the imide salt as the electrolyte salt.

Examples 9-1 to 9-9

Coin type secondary batteries were fabricated in the same manner as that of Examples 8-1 to 8-9, except that the anode was formed as follows.

First, 90 wt % of silicon powder as an anode active material having an average particle diameter of 1 μm and 10 wt % of polyvinylidene fluoride as a binder were mixed, the resultant mixture was dispersed in N-methyl-2-pyrrolidone as a solvent to obtain anode mixture slurry. Subsequently, the anode current collector 52A made of a copper foil being 18 μm thick was uniformly coated with the anode mixture slurry, and the resultant was dried and pressurized. After that, the resultant was heated in the vacuum atmosphere at 400 deg C. for 12 hours to form the anode active material layer 52B, which was punched out into a pellet being 16 mm in diameter to form the anode 52.

TABLE 8

Battery structure: coin type

| | Anode active material | Electrolytic solution solvent (wt %) | | | | | Electrolyte salt | | Borate | | TOF-SIMS peak ratio | | | Discharge capacity retention ratio (%) |
|---|---|---|---|---|---|---|---|---|---|---|---|---|---|---|
| | | EC | DEC | FEC | DFEC | VC | Type | Concentration (mol/kg) | Type | Concentration (wt %) | $Li_2PO_2F_2+$/$Si+$ | $Li_3PO_3F+$/$Si+$ | $Li_2BO_2+$/$Si+$ | |
| Example 8-1 | Silicon | 30 | 70 | — | — | — | $LiPF_6$ | 1 | $Li_2B_4O_7$ | 0.5 | 4.51 | 2.74 | 5.03 | 56 |
| Example 8-2 | (evaporation method) | 30 | 70 | — | — | — | $LiPF_6$ | 1 | $Li_2B_4O_7$ | 1 | 3.93 | 2.11 | 7.05 | 53 |
| Example 8-3 | | 30 | 70 | — | — | — | $LiPF_6$ | 1 | $Li_2B_4O_7$ | 5 | 3.14 | 1.66 | 13.5 | 32 |
| Example 8-4 | | 10 | 70 | 20 | — | — | $LiPF_6$ | 1 | $Li_2B_4O_7$ | 0.5 | 5.15 | 3.18 | 8.30 | 71 |
| Example 8-5 | | 25 | 70 | — | 5 | — | $LiPF_6$ | 1 | $Li_2B_4O_7$ | 0.5 | 4.72 | 2.85 | 8.65 | 73 |
| Example 8-6 | | 25 | 70 | — | — | 5 | $LiPF_6$ | 1 | $Li_2B_4O_7$ | 0.5 | 3.13 | 2.14 | 5.55 | 60 |
| Example 8-7 | | 30 | 70 | — | — | — | $LiPF_6$ | 1 | $LiBO_2$ | 0.5 | 4.53 | 3.03 | 4.32 | 58 |
| Example 8-8 | | 30 | 70 | — | — | — | $LiPF_6$ LiBOB | 0.8 0.2 | $Li_2B_4O_7$ | 0.5 | 4.11 | 2.68 | 15.6 | 58 |
| Example 8-9 | | 30 | 70 | — | — | — | LiBETI | 1 | $Li_2B_4O_7$ | 0.5 | 2.91 | 1.89 | 4.89 | 59 |
| Example 8-10 | | — | 50 | 50 | — | — | $LiPF_6$ | 1 | $LiB_4$ | — | 24.2 | 9.05 | 166.7 | 75 |
| Comparative example 8-1 | Silicon (evaporation method) | 30 | 70 | — | — | — | $LiPF_6$ | 1 | — | — | 0.27 | 0.31 | — | 23 |
| Comparative example 8-2 | | 10 | 70 | 20 | — | — | $LiPF_6$ | 1 | — | — | 0.55 | 0.69 | — | 70 |
| Comparative example 8-3 | | — | 50 | 50 | — | — | $LiPF_6$ | 1 | — | — | 44.2 | 50.3 | — | 74 |

Secondary batteries of Examples 9-1 to 9-9 were fabricated in the same manner as that of Examples 8-1 to 8-9 with the use of the foregoing anode 52.

As Comparative example 9-1, a secondary battery was fabricated in the same manner as that of Example 9-1, except that lithium tetrafluoroborate was not added. As Comparative example 9-2 relative to Example 9-4, a secondary battery was fabricated in the same manner as that of Example 9-4, except that the same electrolytic solution solvent was used but lithium tetrafluoroborate was not added.

For the fabricated secondary batteries of Examples 9-1 to 9-9 and Comparative examples 9-1 and 9-2, TOF-SIMS and the cycle characteristics were examined in the same manner as that of Example 1-1. The results thereof are shown in Table 9.

80 parts by weight of a SnCoC-containing material as an anode active material, 11 parts by weight of graphite and 1 part by weight of acetylene black as an electrical conductor, and 8 parts by weight of polyvinylidene fluoride as a binder were mixed, the resultant mixture was dispersed in N-methyl-2-pyrrolidone as a solvent to obtain anode mixture slurry. Subsequently, the anode current collector 52A made of a copper foil being 10 μm thick was uniformly coated with the anode mixture slurry, and the resultant was dried. After that, the resultant was compression-molded to form the anode active material layer 52B, which was punched out into a pellet being 16 mm in diameter.

The SnCoC-containing material was synthesized by mixing tin-cobalt-indium alloy powder and carbon powder and using mechanochemical reaction. For the obtained SnCoC-containing material, the composition of the SnCoC-contain-

TABLE 9

Battery structure: coin type

| | Anode active material | Electrolytic solution solvent (wt %) | | | | | Electrolyte salt | | Borate | | TOF-SIMS peak ratio | | | Discharge capacity retention ratio (%) |
|---|---|---|---|---|---|---|---|---|---|---|---|---|---|---|
| | | EC | DEC | FEC | DFEC | VC | Type | Concentration (mol/kg) | Type | Concentration (wt %) | $Li_2PO_2F_2+/Si+$ | $Li_3PO_3F+/Si+$ | $Li_2BO_2+/Si+$ | |
| Example 9-1 | Silicon | 30 | 70 | — | — | — | $LiPF_6$ | 1 | $Li_2B_4O_7$ | 0.5 | 2.12 | 1.91 | 4.85 | 46 |
| Example 9-2 | (sinter- | 30 | 70 | — | — | — | $LiPF_6$ | 1 | $Li_2B_4O_7$ | 1 | 1.91 | 0.89 | 6.23 | 45 |
| Example 9-3 | ing | 30 | 70 | — | — | — | $LiPF_6$ | 1 | $Li_2B_4O_7$ | 5 | 0.44 | 0.52 | 11.8 | 35 |
| Example 9-4 | method) | 10 | 70 | 20 | — | — | $LiPF_6$ | 1 | $Li_2B_4O_7$ | 0.5 | 3.37 | 2.21 | 8.10 | 72 |
| Example 9-5 | | 25 | 70 | — | 5 | — | $LiPF_6$ | 1 | $Li_2B_4O_7$ | 0.5 | 3.81 | 2.95 | 8.05 | 75 |
| Example 9-6 | | 25 | 70 | — | — | 5 | $LiPF_6$ | 1 | $Li_2B_4O_7$ | 0.5 | 2.88 | 3.13 | 6.00 | 66 |
| Example 9-7 | | 30 | 70 | — | — | — | $LiPF_6$ | 1 | $LiBO_2$ | 0.5 | 1.21 | 1.79 | 5.03 | 48 |
| Example 9-8 | | 30 | 70 | — | — | — | $LiPF_6$ LiBOB | 0.8 0.2 | $Li_2B_4O_7$ | 0.5 | 1.79 | 1.19 | 18.3 | 47 |
| Example 9-9 | | 30 | 70 | — | — | — | LiBETI | 1 | $Li_2B_4O_7$ | 0.5 | 1.94 | 1.86 | 4.65 | 48 |
| Comparative example 9-1 | Silicon (sinter- | 30 | 70 | — | — | — | $LiPF_6$ | 1 | — | — | 0.27 | 0.32 | — | 30 |
| Comparative example 9-2 | ing method) | 10 | 70 | 20 | — | — | $LiPF_6$ | 1 | — | — | 0.18 | 0.28 | — | 70 |

As shown in Table 9, it was found that when the anode active material was silicon, and the borate (lithium tetraborate or lithium metaborate) was added to the electrolytic solution, the cycle characteristics were significantly improved. When the additive amount of lithium borate was smaller, the cycle characteristics were more favorable. Further, in all examples, a sufficient TOF-SIMS peak ratio was obtained.

Further, from the results of Examples 9-1 to 9-3, it was found that when the content of the borate in the electrolytic solution was in the range from 0.5 wt % to 5 wt %, superior cycle characteristics were obtained. In this case, when the content of the borate was 0.01 wt % or more, superior cycle characteristics were obtained as well. Further, from the results of Examples 9-4 to 9-6, it was found that the cycle characteristics were further improved by using fluorinated carbonate as an electrolytic solution solvent. From the results of Examples 9-8 and 9-9, it was found that the cycle characteristics were further improved by using lithium bisoxalate borate or the imide salt as the electrolyte salt.

Examples 10-1 to 10-9

Coin type secondary batteries were fabricated in the same manner as that of Examples 8-1 to 8-9, except that the anode was formed as follows.

ing material was analyzed. The tin content was 48 wt %, the cobalt content was 23 wt %, the carbon content was 20 wt %, and the cobalt ratio to the total of tin and cobalt (Co/(Sn+Co)) was 32.4 wt %. The carbon content was measured by a carbon sulfur analyzer. The tin content and the cobalt content were measured by Inductively Coupled Plasma (ICP) optical emission spectroscopy. Further, the obtained SnCoC-containing material was provided with X-ray diffraction. As a result, the diffraction peak having a wide half bandwidth in which diffraction angle 2θ was 1.0 degree or more was observed in the range of the diffraction angle 2θ=20 to 50 degrees. Furthermore, when the SnCoC-containing material was provided with XPS, Peak P1 was obtained as shown in FIG. 10. When Peak P1 was analyzed, Peak P2 of the surface contamination carbon and Peak P3 of C1s in the SnCoC-containing material on the energy side lower than that of Peak P2 were obtained. The Peak P3 was obtained in the region lower than 284.5 eV. That is, it was confirmed that carbon in the SnCoC-containing material was bonded to other element.

Secondary batteries were fabricated in the same manner as that of Example 8-1, except that the foregoing anode 52 was used, and for the electrolytic solution, as a solvent, an electrolyte, and a poly acid salt, the compounds shown in Table 10 were used.

As Comparative example 10-1, a secondary battery was fabricated in the same manner as that of Example 10-1, except that lithium tetraborate was not added. As Comparative example 10-2 relative to Example 10-4, a secondary battery was fabricated in the same manner as that of Example 10-4, except that the same electrolytic solution solvent was used but lithium tetrafluoroborate was not added.

For the fabricated secondary batteries of Examples 10-1 to 10-9 and Comparative examples 10-1 and 10-2, TOF-SIMS and the cycle characteristics were examined in the same manner as that of Example 1-1. The results thereof are shown in Table 10.

Examples 10-8 and 10-9, it was found that the cycle characteristics were further improved by additionally using lithium bisoxalate borate or the imide salt as the electrolyte salt.

Example 11-1

The cylindrical secondary battery shown in FIG. 1 and FIG. 2 was fabricated. The cathode 21 was formed in the same manner as that of Example 8-1. The anode 22 was formed by forming the anode active material layer 22B

TABLE 10

Battery structure: coin type

| | Anode active material | Electrolytic solution solvent (wt %) | | | | | Electrolyte salt | | Borate | | TOF-SIMS peak ratio | | | Discharge capacity retention ratio (%) |
|---|---|---|---|---|---|---|---|---|---|---|---|---|---|---|
| | | EC | DEC | FEC | DFEC | VC | Type | Concentration (mol/kg) | Type | Concentration (wt %) | $Li_2PO_2F_2+/Si+$ | $Li_3PO_3F+/Si+$ | $Li_2BO_2+/Si+$ | |
| Example 10-1 | SnCoC (coating method) | 30 | 70 | — | — | — | $LiPF_6$ | 1 | $Li_2B_4O_7$ | 0.5 | 1.93 | 2.21 | 4.65 | 68 |
| Example 10-2 | | 30 | 70 | — | — | — | $LiPF_6$ | 1 | $Li_2B_4O_7$ | 1 | 1.54 | 2.03 | 6.01 | 68 |
| Example 10-3 | | 30 | 70 | — | — | — | $LiPF_6$ | 1 | $Li_2B_4O_7$ | 5 | 1.03 | 1.21 | 10.4 | 66 |
| Example 10-4 | | 20 | 70 | 10 | — | — | $LiPF_6$ | 1 | $Li_2B_4O_7$ | 0.5 | 2.88 | 3.11 | 7.88 | 86 |
| Example 10-5 | | 25 | 70 | — | 5 | — | $LiPF_6$ | 1 | $Li_2B_4O_7$ | 0.5 | 2.91 | 2.98 | 7.86 | 86 |
| Example 10-6 | | 25 | 70 | — | — | 5 | $LiPF_6$ | 1 | $Li_2B_4O_7$ | 0.5 | 2.14 | 2.88 | 5.35 | 82 |
| Example 10-7 | | 30 | 70 | — | — | — | $LiPF_6$ | 1 | $LiBO_2$ | 0.5 | 1.76 | 1.87 | 4.68 | 69 |
| Example 10-8 | | 30 | 70 | — | — | — | $LiPF_6$ LiBOB | 0.8 0.2 | $Li_2B_4O_7$ | 0.5 | 1.91 | 1.65 | 17.5 | 69 |
| Example 10-9 | | 30 | 70 | — | — | — | LiBETI | 1 | $Li_2B_4O_7$ | 0.5 | 1.77 | 1.44 | 4.43 | 70 |
| Comparative example 10-1 | SnCoC (coating method) | 30 | 70 | — | — | — | $LiPF_6$ | 1 | — | — | 0.95 | 1.17 | — | 65 |
| Comparative example 10-2 | | 20 | 70 | 10 | — | — | $LiPF_6$ | 1 | — | — | 0.88 | 1.01 | — | 85 |

As shown in Table 10, it was found that when the anode active material contained tin, and the borate (lithium tetraborate or lithium metaborate) was added to the electrolytic solution, the cycle characteristics were significantly improved. When the additive amount of lithium borate was smaller, the cycle characteristics were favorable. Further, in all examples, a sufficient TOF-SIMS peak ratio was obtained.

Further, from the results of Examples 10-1 to 10-3, it was found that when the content of the borate in the electrolytic solution was in the range from 0.5 wt % to 5 wt %, superior cycle characteristics were obtained, and when the content of the borate was 0.01 wt % or more, superior cycle characteristics were obtained as well. Further, from the results of Examples 10-4 to 10-6, it was found that the cycle characteristics were further improved by using fluorinated carbonate as an electrolytic solution solvent. From the results of composed of silicon by electron beam evaporation method, and forming an oxide-containing film composed of silicon dioxide. For the separator 23, a microporous polypropylene film being 25 μm thick was used. An electrolytic solution was similar to that of Example 8-1. Accordingly, the secondary battery of Example 11-1 was fabricated.

As Comparative example 11-1 relative to Example 11-1, a secondary battery was fabricated in the same manner as that of Example 11-1, except that lithium tetraborate was not added to the electrolytic solution.

For the secondary batteries of Example 11-1 and Comparative example 11-1, TOF-SIMS and the cycle characteristics were examined in the same manner as that of Example 1-1. The results thereof are shown in Table 11.

TABLE 11

Battery structure: cylindrical

| | Anode | | Electrolytic solution solvent (wt %) | | Electrolyte salt | | Borate | | TOF-SIMS peak ratio | | | Discharge capacity retention ratio (%) |
|---|---|---|---|---|---|---|---|---|---|---|---|---|
| | Anode active material | Treatment | EC | DEC | Type | Concentration (mol/kg) | Type | Concentration (wt %) | $Li_2PO_2F_2+/Si+$ | $Li_3PO_3F+/Si+$ | $Li_2BO_2+/Si+$ | |
| Example 11-1 | Silicon (sintering method) | $SiO_2$ coating | 30 | 70 | $LiPF_6$ | 1 | $Li_2B_4O_7$ | 0.5 | 5.81 | 4.88 | 4.78 | 65 |
| Comparative example 11-1 | Silicon (sintering method) | $SiO_2$ coating | 30 | 70 | $LiPF_6$ | 1 | — | — | 0.34 | 0.41 | — | 20 |

As shown in Table 11, it was found that when the anode active material particles containing silicon were covered with the silicon oxide, and lithium tetraborate was added to the electrolytic solution, the cycle characteristics were significantly improved.

Examples 12-1 to 12-9

Laminated film secondary batteries shown in FIG. 7 and FIG. 8 were fabricated. The cathode 33 was formed in the same manner as that of Example 8-1. The anode 34 was formed by forming the anode active material particles composed of silicon by electron beam evaporation method, and then forming an oxide-containing film composed of silicon dioxide.

For the separator, a microporous polypropylene film being 25 μm thick was used.

Next, the cathode lead 31 made of aluminum was attached to the cathode 33 and the anode lead 32 made of nickel was attached to the anode 34. The cathode 33 and the anode 34 were layered with the separator 35 in between to obtain a laminated body. After that, the laminated body was spirally wound, the resultant was enclosed into the package member 40 made of a laminated film under the reduced pressure. Thereby, secondary batteries of Examples 12-1 to 12-9 were fabricated. For the electrolytic solution, as a solvent, an electrolyte, and a poly acid salt, the compounds shown in Table 12 were used.

As Comparative example 12-1, a secondary battery was fabricated in the same manner as that of Example 12-1, except that lithium tetraborate was not added.

As Comparative example 12-2 relative to Example 12-4, a secondary battery was fabricated in the same manner as that of Example 12-4, except that lithium tetraborate was not added.

For the fabricated secondary batteries of Examples 12-1 to 12-9 and Comparative examples 12-1 and 12-2, TOF-SIMS and the cycle characteristics were examined in the same manner as that of Example 1-1. The results thereof are shown in Table 12.

TABLE 12

Battery structure: laminated film

| | Anode active material | Electrolytic solution solvent (wt %) | | | | | Electrolyte salt | | Borate | | TOF-SIMS peak ratio | | | Discharge capacity retention ratio (%) |
|---|---|---|---|---|---|---|---|---|---|---|---|---|---|---|
| | | EC | DEC | FEC | DFEC | VC | Type | Concentration (mol/kg) | Type | Concentration (wt %) | $Li_2PO_2F_2+/Si+$ | $Li_3PO_3F+/Si+$ | $Li_2BO_2+/Si+$ | |
| Example 12-1 | Silicon (evaporation method) | 30 | 70 | — | — | — | $LiPF_6$ | 1 | $Li_2B_4O_7$ | 0.5 | 4.35 | 2.11 | 5.65 | 52 |
| Example 12-2 | | 30 | 70 | — | — | — | $LiPF_6$ | 1 | $Li_2B_4O_7$ | 1 | 3.27 | 1.92 | 7.83 | 51 |
| Example 12-3 | | 30 | 70 | — | — | — | $LiPF_6$ | 1 | $Li_2B_4O_7$ | 5 | 1.77 | 0.89 | 18.3 | 21 |
| Example 12-4 | | 10 | 70 | 20 | — | — | $LiPF_6$ | 1 | $Li_2B_4O_7$ | 0.5 | 3.77 | 3.11 | 8.46 | 64 |
| Example 12-5 | | 25 | 70 | — | 5 | — | $LiPF_6$ | 1 | $Li_2B_4O_7$ | 0.5 | 3.98 | 3.78 | 8.14 | 67 |
| Example 12-6 | | 25 | 70 | — | — | 5 | $LiPF_6$ | 1 | $Li_2B_4O_7$ | 0.5 | 2.87 | 2.97 | 6.03 | 55 |
| Example 12-7 | | 30 | 70 | — | — | — | $LiPF_6$ | 1 | $LiBO_2$ | 0.5 | 1.99 | 2.67 | 5.35 | 53 |
| Example 12-8 | | 30 | 70 | — | — | — | $LiPF_6$ LiBOB | 0.8 0.2 | $Li_2B_4O_7$ | 0.5 | 1.08 | 2.12 | 17.3 | 53 |
| Example 12-9 | | 30 | 70 | — | — | — | LiBETI | 1 | $Li_2B_4O_7$ | 0.5 | 1.82 | 2.94 | 5.36 | 59 |

TABLE 12-continued

Battery structure: laminated film

| | Anode active material | Electrolytic solution solvent (wt %) | | | | | Electrolyte salt | | Borate | | TOF-SIMS peak ratio | | | Discharge capacity retention ratio (%) |
|---|---|---|---|---|---|---|---|---|---|---|---|---|---|---|
| | | EC | DEC | FEC | DFEC | VC | Type | Concentration (mol/kg) | Type | Concentration (wt %) | $Li_2PO_2F_2+/Si+$ | $Li_3PO_3F+/Si+$ | $Li_2BO_2+/Si+$ | |
| Comparative example 12-1 | Silicon (evaporation method) | 30 | 70 | — | — | — | $LiPF_6$ | 1 | — | — | 0.29 | 0.33 | — | 20 |
| Comparative example 12-2 | | 10 | 70 | 20 | — | — | $LiPF_6$ | 1 | — | — | 0.18 | 0.41 | — | 63 |

As shown in Table 12, it was found that when the anode active material was silicon, and the borate (lithium tetraborate or lithium metaborate) was added to the electrolytic solution, the cycle characteristics were significantly improved. When the additive amount of lithium borate was smaller, the cycle characteristics were more favorable. Further, in all examples, a sufficient TOF-SIMS peak ratio was obtained.

Further, from the results of Examples 12-1 to 12-3, it was found that when the content of the borate in the electrolytic solution was in the range from 0.5 wt % to 5 wt %, superior cycle characteristics were obtained, and when the content of the borate was 0.01 wt % or more, superior cycle characteristics were obtained as well. Further, from the results of Examples 12-4 to 12-6, it was found that the cycle characteristics were further improved by using fluorinated carbonate as an electrolytic solution solvent. From the results of Examples 12-8 and 12-9, it was found that the cycle characteristics were further improved by using lithium bisoxalate borate or the imide salt as the electrolyte salt.

The invention has been described with reference to the embodiments and the examples. However, the invention is not limited to the aspects described in the foregoing embodiments and the foregoing examples, and various modifications may be made. For example, in the foregoing embodiments and the foregoing examples, other type of electrolyte may be used. As other electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte or the like is cited.

Further, in the foregoing embodiments and the foregoing examples, the descriptions have been given of the lithium ion secondary battery in which the anode capacity is expressed based on insertion and extraction of lithium as a battery of the invention. However, the battery type of the invention is not limited thereto. The invention is similarly applicable to a battery in which the anode capacity includes the capacity based on insertion and extraction of lithium and the capacity based on precipitation and dissolution of lithium, and the anode capacity is expressed as the sum of these capacities, by setting the charge capacity of the anode active material capable of inserting and extracting lithium to a smaller value than the charge capacity of the cathode.

Further, in the foregoing embodiments and the foregoing examples, the description has been given of the case using lithium as an electrode reactant. However, as an electrode reactant, other Group 1A element in the short period periodic table such as sodium (Na) and potassium (K), a Group 2A element such as magnesium and calcium (Ca), or other light metal such as aluminum may be used. In this case, the anode material described in the foregoing embodiment may be used as an anode active material as well.

Further, in the foregoing embodiments and the foregoing examples, regarding the content of the borate in the electrolytic solution of the secondary battery of the invention, the appropriate value range thereof derived from the results of the examples has been described. However, such a description does not totally eliminate the possibility that the content may be out of the foregoing range. That is, the foregoing appropriate range is the range particularly preferable for obtaining the effects of the invention. Therefore, as long as effects of the invention are obtained, the content may be out of the foregoing range in some degrees.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery comprising:
   a cathode;
   an anode; and
   an electrolytic solution,
   wherein,
   the anode comprises an anode current collector and an anode active material layer on the anode current collector,
   the anode active material layer comprises anode active material particles layered on the current collector,
   the anode active material particles comprise (1) particles with at least one of silicon or tin, (2) a coat coating at least a portion of the anode active material particles, the coat consisting of lithium metaborate,
   the coat coats exposed outer surfaces of the anode active material particles such that the particles are coated with the coat down to roots thereof.

2. The secondary battery according to claim 1, wherein the anode active material particles have a multilayer structure in the particles as would result from vapor deposition.

3. The secondary battery according to claim 1, wherein the electrolytic solution includes a borate.

4. The secondary battery according to claim 3, wherein a content of the borate in the electrolytic solution is in the range from 0.01 wt % to 5 wt %.

5. The secondary battery according to claim 1, wherein the electrolytic solution includes at least one of 4-fluoro-1,3-dioxolane-2-one, 4,5-difluoro-1,3-dioxolane-2-one, fluoromethyl methyl carbonate, bis(fluoromethyl)carbonate, or difluoromethyl methyl carbonate.

6. The secondary battery according to claim 1, wherein the electrolytic solution includes sultone.

7. The secondary battery according to claim 1, wherein the cathode comprises a complex oxide containing lithium and nickel.

8. The secondary battery according to claim 1, wherein the anode active material particles include silicon and oxygen or carbon.

9. The secondary battery according to claim 1, wherein the anode active material particles include an alloy containing silicon and at least one selected from the group consisting of tin, nickel, copper, iron, cobalt, manganese, zinc, indium, silver, titanium, germanium, bismuth, antimony, and chromium.

10. The secondary battery according to claim 1, wherein the anode active material layer includes a carbon material particle.

11. The secondary battery of claim 1, wherein the anode further includes, metal material in the gaps, the metal material comprising a metal element that does not alloy with an anode reactant.

12. The secondary battery of claim 11, wherein the metal element is selected from the group consisting of iron, cobalt, nickel, zinc, and copper.

13. The secondary battery of claim 11, wherein: the metal material fills the gaps, and voids at upper surfaces of the anode active material particles coated with the first and second coats.

14. The secondary battery of claim 11, wherein the metal material fills 20% or more of all space of the gaps.

15. The secondary battery of claim 11, wherein the metal material fills 40% or more of all space of the gaps.

16. The secondary battery of claim 11, wherein the metal material fills 80% or more of all space of the gaps.

* * * * *